US011596863B2

(12) United States Patent
Tartaj

(10) Patent No.: US 11,596,863 B2
(45) Date of Patent: Mar. 7, 2023

(54) CONTROLLING A USER INTERFACE OF A COMPUTER DEVICE

(71) Applicant: KING.COM LIMITED, St. Julians (MT)

(72) Inventor: Miguel Tartaj, Barcelona (ES)

(73) Assignee: KING.COM LTD., St. Julians (MT)

( * ) Notice: Subject to any disclaimer, the term of this patent is extended or adjusted under 35 U.S.C. 154(b) by 150 days.

(21) Appl. No.: 17/007,078

(22) Filed: Aug. 31, 2020

(65) Prior Publication Data
US 2020/0398164 A1 Dec. 24, 2020

Related U.S. Application Data

(63) Continuation of application No. 16/103,097, filed on Aug. 14, 2018, now Pat. No. 10,758,825.
(Continued)

(51) Int. Cl.
*A63F 13/00* (2014.01)
*A63F 13/5372* (2014.01)
(Continued)

(52) U.S. Cl.
CPC ........ *A63F 13/5372* (2014.09); *A63F 13/335* (2014.09); *A63F 13/355* (2014.09);
(Continued)

(58) Field of Classification Search
None
See application file for complete search history.

(56) References Cited

U.S. PATENT DOCUMENTS 5,186,460 A * 2/1993 Fongeallaz ............. A63F 9/143
463/6
5,213,555 A * 5/1993 Hood ...................... A63F 13/57
482/902
(Continued)

OTHER PUBLICATIONS

Diddy Kong Racing Manual, Nintendo, 1997 at https://archive.org/details/diddy-kong-racing-n64-manual-nus-ndye-usa/page/n1/mode/2up (Year: 1997).*

*Primary Examiner* — Paul A D'Agostino
(74) *Attorney, Agent, or Firm* — Saul Ewing LLP

(57) ABSTRACT

A method for displaying the relative positions of two players playing a game on a user device. The set of levels within an episode that a first player is playing are displayed on the graphical user interface of his computer device. These levels are set out in a predetermined order, wherein access to the next level is granted once the player has completed the preceding levels. Inputs from the player are received as the player plays each level. This enables the game to determine when the level has been completed, and to generate player data indicating the level the player is playing. In an episode race, the relative positions of the two players can then be displayed based on the time taken for the first and second players to complete one or more levels in their respective sets of levels. A player may compete against bots, created from historic user data, or against live opponents. In another feature, the user can select a specific theme from a group of themes to play an episode of the game in. In another feature, the user can invite another user to play in the same theme as him, even if the two players are playing different levels with different difficulties.

27 Claims, 22 Drawing Sheets

Related U.S. Application Data

(60) Provisional application No. 62/579,431, filed on Oct. 31, 2017.

(51) Int. Cl.
*A63F 13/56* (2014.01)
*A63F 13/79* (2014.01)
*A63F 13/655* (2014.01)
*A63F 13/335* (2014.01)
*A63F 13/355* (2014.01)
*A63F 13/44* (2014.01)
*A63F 13/69* (2014.01)

(52) U.S. Cl.
CPC .............. *A63F 13/44* (2014.09); *A63F 13/56* (2014.09); *A63F 13/655* (2014.09); *A63F 13/69* (2014.09); *A63F 13/79* (2014.09); *A63F 2300/308* (2013.01); *A63F 2300/5533* (2013.01)

(56) References Cited

U.S. PATENT DOCUMENTS

| | | | | |
|---|---|---|---|---|
| 5,926,179 | A * | 7/1999 | Matsuda | G06F 3/14 715/236 |
| 6,149,519 | A * | 11/2000 | Osaki | A63F 13/803 463/30 |
| 6,174,237 | B1 * | 1/2001 | Stephenson | A63F 13/12 463/40 |
| 6,579,173 | B1 * | 6/2003 | Okuda | A63F 13/798 463/6 |
| 6,692,359 | B1 * | 2/2004 | Williams | A63F 13/795 715/833 |
| 6,835,137 | B1 * | 12/2004 | Nakamura | A63F 13/10 463/42 |
| 7,904,577 | B2 * | 3/2011 | Taylor | H04L 41/22 709/227 |
| 8,332,544 | B1 * | 12/2012 | Ralls | A63F 13/92 710/8 |
| 8,333,662 | B2 * | 12/2012 | Ohta | A63F 13/211 463/36 |
| 8,505,008 | B2 * | 8/2013 | Yamazaki | G06F 9/4843 718/103 |
| 8,550,920 | B1 * | 10/2013 | Allen | G07F 17/3241 463/25 |
| 9,220,985 | B1 * | 12/2015 | Auterio | A63F 13/32 |
| 9,616,342 | B2 * | 4/2017 | Motokura | A63F 13/77 |
| 9,700,789 | B2 * | 7/2017 | Cotter | A63F 13/87 |
| 10,080,968 | B2 * | 9/2018 | Gould | H04L 67/55 |
| 10,140,317 | B2 * | 11/2018 | McKinnon | H05K 999/99 |
| 10,409,457 | B2 * | 9/2019 | Baack | A63F 13/35 |
| 10,913,003 | B2 * | 2/2021 | Miura | H04N 21/4788 |
| 10,981,057 | B2 * | 4/2021 | Hirose | A63F 13/79 |
| 11,207,589 | B2 * | 12/2021 | Navio | A63F 13/55 |
| 11,376,510 | B2 * | 7/2022 | Dugan | A63F 13/31 |
| 2003/0078102 | A1 * | 4/2003 | Okita | G07F 17/3283 463/42 |
| 2003/0211887 | A1 * | 11/2003 | Yamamoto | A63F 13/422 463/31 |
| 2003/0218301 | A1 * | 11/2003 | Gonzalez | A63F 3/00082 273/248 |
| 2005/0026695 | A1 * | 2/2005 | Tsuchiyama | A63F 13/52 463/42 |
| 2005/0096110 | A1 * | 5/2005 | Ohyagi | A63F 13/56 463/6 |
| 2005/0277455 | A1 * | 12/2005 | Chudley | A63F 13/10 463/6 |
| 2005/0278041 | A1 * | 12/2005 | Bortnik | A63F 13/12 700/91 |
| 2006/0040793 | A1 * | 2/2006 | Martens | G16H 20/30 482/8 |
| 2006/0111169 | A1 * | 5/2006 | Hornik | G07F 17/32 463/16 |
| 2007/0191105 | A1 * | 8/2007 | Azuma | A63F 13/12 463/42 |
| 2007/0281285 | A1 * | 12/2007 | Jayaweera | G09B 7/02 434/188 |
| 2008/0039164 | A1 * | 2/2008 | Shimada | A63F 13/5258 463/6 |
| 2008/0108406 | A1 * | 5/2008 | Oberberger | G07F 17/3206 463/16 |
| 2008/0280676 | A1 * | 11/2008 | Distanik | G07F 17/32 463/31 |
| 2009/0082112 | A1 * | 3/2009 | Itskov | A63F 13/46 463/42 |
| 2011/0107220 | A1 * | 5/2011 | Perlman | H04L 65/401 715/720 |
| 2011/0107239 | A1 * | 5/2011 | Adoni | A63F 13/12 726/8 |
| 2011/0265018 | A1 * | 10/2011 | Borst | A63F 13/87 715/757 |
| 2011/0300916 | A1 * | 12/2011 | Patchen | A63F 13/46 463/1 |
| 2012/0028700 | A1 * | 2/2012 | Avent | A63F 13/537 463/43 |
| 2012/0142429 | A1 * | 6/2012 | Muller | A63F 13/69 463/42 |
| 2012/0172131 | A1 * | 7/2012 | Boswell | A63F 13/795 463/42 |
| 2012/0225723 | A1 * | 9/2012 | Webster | A63F 13/798 463/43 |
| 2013/0072308 | A1 * | 3/2013 | Peck | A63F 13/332 463/42 |
| 2013/0079075 | A1 * | 3/2013 | Osvald | A63F 13/87 463/7 |
| 2013/0079082 | A1 * | 3/2013 | Bancel | A63F 3/0415 463/9 |
| 2013/0095931 | A1 * | 4/2013 | Fiedler | A63F 13/77 463/43 |
| 2013/0103310 | A1 * | 4/2013 | Kaido | H04M 1/72457 701/519 |
| 2013/0123019 | A1 * | 5/2013 | Sullivan | A63F 13/35 463/42 |
| 2013/0143631 | A1 * | 6/2013 | Platzer | A63F 13/65 463/6 |
| 2013/0198334 | A1 * | 8/2013 | Ikenaga | A63F 13/44 709/217 |
| 2013/0227675 | A1 * | 8/2013 | Fujioka | G06F 21/62 726/16 |
| 2013/0231760 | A1 * | 9/2013 | Rosen | A63F 13/816 700/91 |
| 2013/0254660 | A1 * | 9/2013 | Fujioka | A63F 13/12 715/741 |
| 2013/0295545 | A1 * | 11/2013 | Dawley | G09B 7/02 434/350 |
| 2013/0304676 | A1 * | 11/2013 | Gupta | G06N 5/043 706/12 |
| 2013/0310181 | A1 * | 11/2013 | Kislyi | A63F 13/837 463/42 |
| 2013/0344953 | A1 * | 12/2013 | Yoshikawa | A63F 13/5378 463/29 |
| 2014/0066191 | A1 * | 3/2014 | Yang | A63F 13/46 463/29 |
| 2014/0106876 | A1 * | 4/2014 | Knutsson | A63F 13/573 463/31 |
| 2014/0370950 | A1 * | 12/2014 | Hansson | A63F 13/00 463/9 |
| 2014/0378195 | A1 * | 12/2014 | Lee | G07F 17/329 463/20 |
| 2014/0378214 | A1 * | 12/2014 | Suzuki | A63F 13/70 463/25 |
| 2015/0080130 | A1 * | 3/2015 | Tanibuchi | A63F 13/65 463/31 |
| 2015/0094128 | A1 * | 4/2015 | Montgomery | A63F 13/537 463/6 |
| 2015/0099566 | A1 * | 4/2015 | Lail | A63F 13/56 463/6 |
| 2015/0111643 | A1 * | 4/2015 | Olofsson | A63F 13/335 463/31 |

(56) References Cited

U.S. PATENT DOCUMENTS

| | | | |
|---|---|---|---|
| 2015/0174489 A1* | 6/2015 | Evald | A63F 13/47 |
| | | | 463/31 |
| 2015/0227296 A1* | 8/2015 | Pringle | A63F 13/55 |
| | | | 715/760 |
| 2015/0238867 A1* | 8/2015 | Gould | H04L 67/55 |
| | | | 463/42 |
| 2015/0246287 A1* | 9/2015 | Etter | A63F 13/87 |
| | | | 463/36 |
| 2015/0265927 A1* | 9/2015 | Taylor | A63F 13/69 |
| | | | 463/9 |
| 2015/0273335 A1* | 10/2015 | Slaby | A63F 13/537 |
| | | | 463/31 |
| 2015/0321099 A1* | 11/2015 | Knuttson | A63F 13/52 |
| | | | 463/31 |
| 2016/0098161 A1* | 4/2016 | Baack | A63F 13/537 |
| | | | 715/764 |
| 2022/0088474 A1* | 3/2022 | Dicken | A63F 13/79 |

* cited by examiner

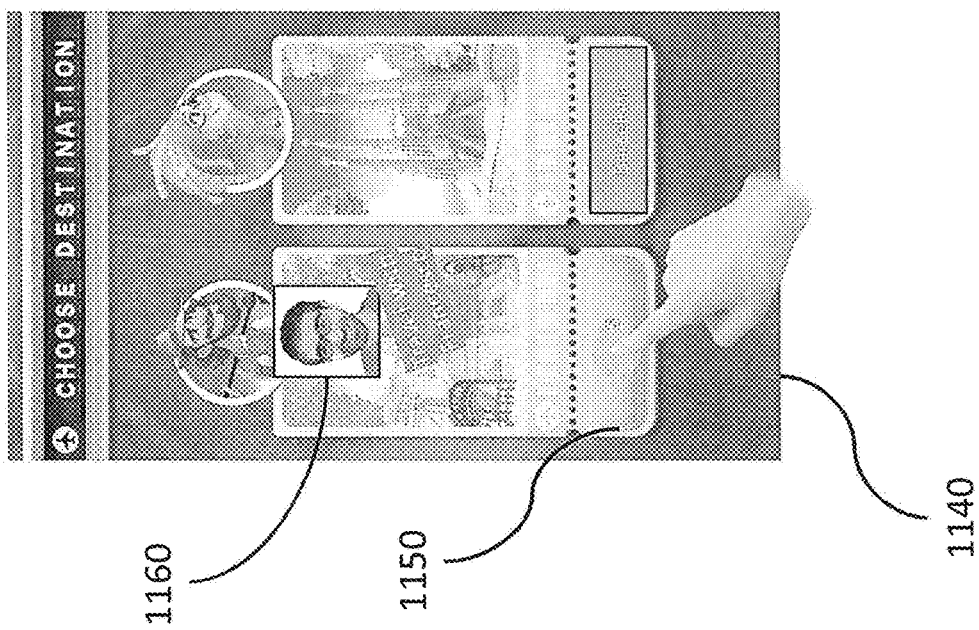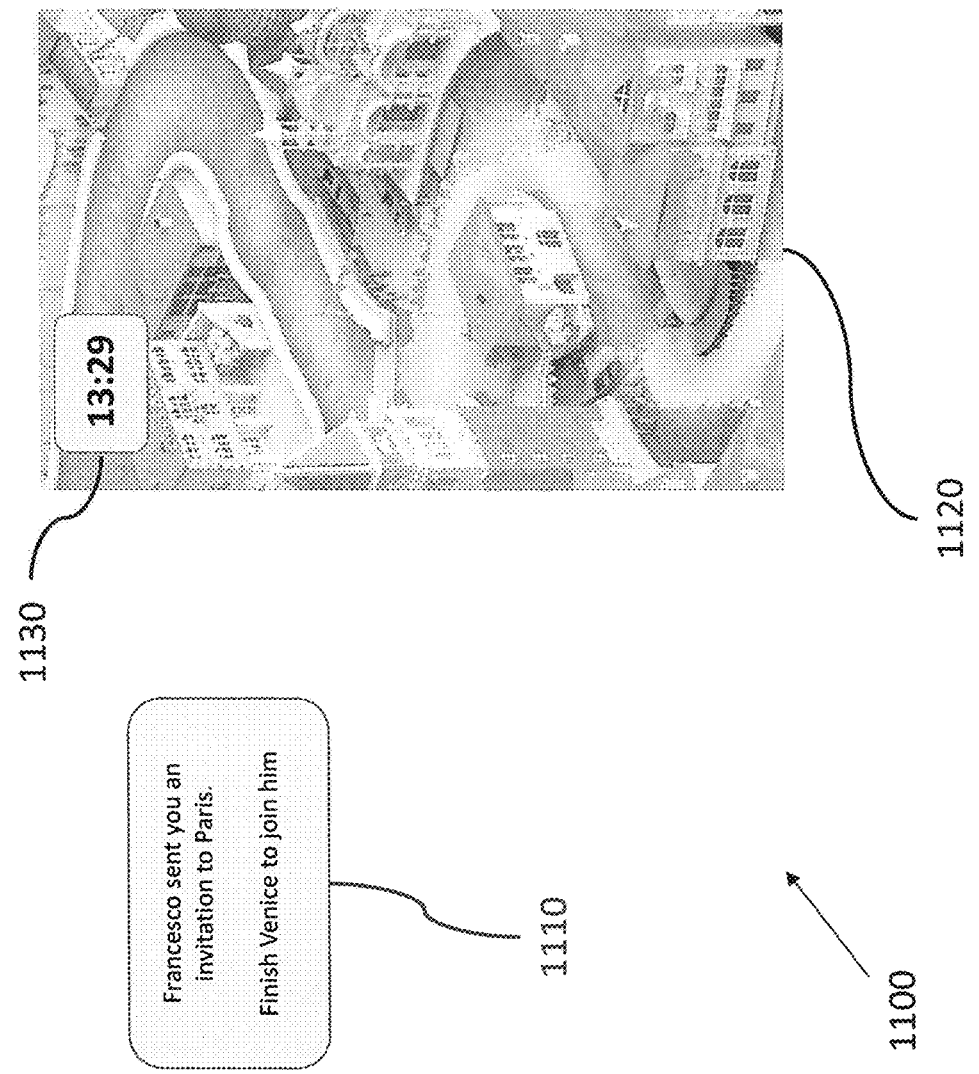
Figure 11

US 11,596,863 B2

CONTROLLING A USER INTERFACE OF A COMPUTER DEVICE

CROSS-REFERENCE TO RELATED APPLICATIONS

This is a continuation of U.S. application Ser. No. 16/103,097, filed on Aug. 14, 2018, which is based on, and claims priority to U.S. Provisional Application No. 62/579,431, filed Oct. 31, 2017, the entire contents of each of which being fully incorporated herein by reference.

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush.

Another known match three-type game is known by the trade name Pet Rescue. Both of these can be played in Saga format. The Saga format is a format in which a plurality of levels of a game are arranged on a level map. The level map may be divided into a plurality of episodes, each episode comprising a set of levels. A level selection screen may be displayed on the display of a user device, the level selection screen showing a set of levels for a user to play.

FIG. 1 illustrates a level selection screen 100 which is rendered on the display of a user terminal to a first player. The level selection screen 100 shows a set of levels, each of which is represented by a node, for example node 110. The level selection screen 100 is displayed with a particular theme. As can been seen from FIG. 1, in this case, the theme is New York. The player marker indicators 120 provide a count of star-shaped markers. Each star-shaped marker denotes the fact that the user has achieved a particular game objective in a particular game mode at that location. On the level selection screen 100, a player icon 130 is shown, indicating the game progress of the first user. When the first user starts the game, this icon 130 is shown at the node that is the furthest level along the game path that the user has not yet completed. Beyond this node 110 are a series of other nodes, e.g. node 150, which represent levels, which the first user has not yet unlocked, and hence cannot be played yet by the first user. On other hand, before the node 110 are a series of nodes, e.g. node 160, which represent levels, which the first user has played and completed. The first user may select one of these levels to play again. In response to user input associated with a node, the level associated with that node may be loaded for play by the first user. The user input associated with the first node may comprise a mouse click or touch screen input at the location of the relevant node.

Also shown on the level selection screen, are a series of identifiers or icons of other users, for example identifier 140. The position of this identifier 140 indicates the progress of the relevant user in the game. For example, the position of the identifier 140 may indicate the furthest level along in the progression path, which the relevant user has unlocked but not completed. Each of the identifiers displayed on the level selection screen 100 may be an identifier of a friend/social network contact of the first user. The terminal of the first user may be configured to receive the progress information of one or more of their friends who are participants in the game, and to display this information on the level selection screen 100, wherein the progress is indicated by the position of the identifier 140 along the level path.

SUMMARY OF THE INVENTION

According to a first aspect, the invention provides a computer implemented method implemented in a server in communication with one or more user devices for executing a game having a plurality of levels, the method comprising: determining for a first user, a set of levels of the plurality of levels for display on a user device of the first user on a level selection screen from which the first user may select a level from the set of levels for play; selecting two or more themes for the level selection screen in dependence upon the set of levels; and transmitting an indication of the selected two or more themes to the user device of the first user.

In another aspect, the invention provides a computer implemented method implemented in a user device by an executable executed by a processor of the device wherein the executable provides a game having a plurality of levels, the method comprising:

selecting two or more themes for a level selection screen from which a user may select one or more levels of a set of levels, wherein the two or more themes are selected in dependence upon the set of levels;

displaying identifiers of the selected two or more themes to the user of the user device; receiving a selection from the user of one of the themes; and providing to a display of the user device for display the level selection screen with the selected theme.

Various embodiments provide a computer implemented method implemented as above comprising one or more of the following features alone or in combination:

a. selecting a group of themes for a level selection screen associated with the set of levels determined for display on the level selection screen on the first device,
wherein the two or more themes are selected from the selected group of themes associated with the set of levels.

b. selecting the two or more themes from the selected group of themes at random.

c. if it is determined that a first set of levels is for display on the level selection screen, selecting a first group of themes for the level selection screen;

if it is determined that a second set of levels is for display on the level selection screen, selecting a second group of themes for the level selection screen.

d. selecting the first group of themes for the level selection screen; and subsequently:

receiving an indication that the second set of levels is for display on the level selection screen;

selecting two or more themes from the second group of themes for the level selection screen; and transmitting an indication of the selected two or more themes from the second group of themes to the user device of the first user.

e. receiving an indication from the device of the first user of a selected theme for the level selection screen for selecting from a first set of levels; and selecting the two or more themes from the second group of themes to be different from the indicated selected theme for level selection screen for selecting from a first set of levels.

A further aspect provides a computer implemented method of controlling a user device, having a display at a user interface and a game code module available to execute a game having a plurality of levels, the method comprising executing in a processor of the user device computer code of the game code module to:

transmit to a server an indication of a set of levels for display on a level selection screen on the user device;

receive from the server an indication of two or more themes for the level selection screen;

display on the display an indication of the two or more themes; and in response to user input associated with one of the or two more themes, display on the display the level selection screen with the one of the two or more themes.

A further aspect provides a computer implemented method of controlling a user device, having a display at a user interface and a game code module available to execute a game having a plurality of levels, the method comprising executing in a processor of the user device, computer code of the game code module to:

display a first theme for a level selection screen from which one or more levels of a first set of levels may be selected for play by a user of the user device;

generate on the display an invitation from a second user at a second user device to use a second theme for a level selection screen from which one or more levels of a first set of levels may be selected for play, wherein the second user is using the second theme for a level selection screen from which one or more levels of a second set of levels may be selected for play;

in response to user input accepting the invitation, displaying on the display, a level selection screen from which one or more levels of the first set of levels may be selected in accordance with the second theme in which the second user is playing.

A further aspect provides a computer implemented method of controlling a user device, having a display at a user interface and a game code module available to execute a game having a plurality of levels, the method comprising executing in a processor of the user device computer code of the game code module to:

receive user input for selecting a theme for a first level selection screen from which a first user may select a level from a first set of the plurality of levels for play;

transmit an indication of the selected theme for the first level selection screen to a server in communication with the user device;

receive from a server an indication that a second user of the game is using the same theme for a second level selection screen from which the second user may select a level from a second set of the plurality of levels for play, wherein the second set is different from the first set;

generate the first level selection screen at the user interface having the selected theme; and display an identifier of the second user on the first level selection screen.

Various embodiments provide a computer implemented method as defined above with one or more of the following features alone or in combination:

f. receiving from the server at another user device an invitation screen which comprises an invitation for the second user to use the selected theme.

g. setting a time limit for the second user to respond to the invitation by selecting the selected theme.

h. wherein the first set differs from the second set in difficulty level.

i. wherein the identifier of the second user is displayed on the first level selection screen at a position indicating progress of the second user in the game.

j. displaying an identifier of a first user on the first level selection screen at a position indicating progress of the first user in the game.

k. receiving from the server, game progress information of the second user, the game progress information indicating a level reached in the plurality of levels of the game, wherein the level reached is part of the second set of the plurality of levels; and displaying the identifier of the second user on the first level selection screen at a relative position in the first set of levels that is the same as a relative position in the second set of levels.

l. prior to receiving the user input, receiving from a user device of the second user, an invitation to select the theme for a first level selection screen.

m. preventing the selection of the theme for the first level selection screen until a third set of levels of the plurality of levels have been completed.

n. displaying the identifier of the second user of the game as an image of the second user which is at least one of: semi-transparent; blurred; and framed in a colour different from an image of the first user.

Another aspect provides a computer implemented method implemented a server in communication with one or more user devices, the method comprising:

receiving from a user device of a first user, an indication of a selected theme for a first level selection screen from which the first user may select a level from at least one of a plurality of levels of a game for play;

determining that a second user of the game is using the selected theme for a second level selection screen from which the second user may select a level from a second set of the plurality of levels for play, wherein the second set is different from the first set; and transmitting to the user device of the first user, an indication that the second user of the game is using the same theme for the level selection as the first user.

Another aspect provides a computer program product comprising computer code on a computer readable media which provides a game mode module which, when executed, performs the method as defined in any of the preceding paragraphs.

Another aspect provides a computer device comprising:
a user interface with a display;
a memory holding executable code of a game mode module
a processor configured to execute the code of the game code module to
receive user input for selecting a theme for a first level selection screen from which a first user may select a level from a first set of the plurality of levels for play;
transmit an indication of the selected theme for the first level selection screen to a server in communication with the user device;
receive from a server an indication that a second user of the game is using the same theme for a second level selection screen from which the second user may select a level from a second set of the plurality of levels for play, wherein the second set is different from the first set; and
generate the first level selection screen at the user interface having the selected theme; and
display an identifier of the second user on the first level selection screen.

Another aspect provides a server comprising:
a processor configured to execute code to:
receive from a user device of a first user, an indication of a selected theme for a first level selection screen from which the first user may select a level from at least one of a plurality of levels of a game for play;
determine that a second user of the game is using the selected theme for a second level selection screen from which the second user may select a level from a second set of the plurality of levels for play, wherein the second set is different from the first set; and
transmit to the user device of the first user, an indication that the second user of the game is using the same theme for the level selection as the first user.

Another aspect provides a computer implemented method of controlling a user device, having a display at a user interface and a game code module available to execute a game having a plurality of levels, the method comprising executing in a processor of the user device computer code of the game code module to:
generate on the display a first level selection screen from which a first user may select a level from a first set of a plurality of levels for play, the first level selection screen having a theme;
display an identifier of the first user on the first level selection screen at a position indicating progress of the first user in the game;
receive from a server an indication that a second user of the game at another user device is using the same theme for a second level selection screen from which the second user may select a level from a second set of the plurality of levels for play, wherein the second set is different from the first set; and
display an identifier of the second user on the first level selection screen at a relative position in the first set of levels that is the same as a relative position in the second set of levels.

Another aspect provides a method of controlling a graphical user interface of a computer device, the method comprising: displaying on the graphical user interface a first set of levels of an episode of a game, the game being executed by a processor of the computer device, the levels playable in a predetermined sequence wherein access to a next level is granted on completion of the preceding levels; at each of the levels, receiving player inputs from a first player engaging with that level, to enable the game to determine when that level has been completed and to generate first player data indicating the level that the first player is engaged with; and displaying on the graphical user interface a visual representation of relative first and second player positions in the first set of levels based on completion time of one or more level in the first set of levels indicated by the first player data relative to a completion time of one or more of a second set of levels indicated by second player data which determines the second player position.

In accordance with this aspect, first and second player data may be used to determine which of a first and second set of levels was completed first in an episode race in the episode. The relative positions of the first and second players may be shown by generating a visual indicator of the second player at the second player's position, determined by the second player data, relative to the visual representation of the first player.

In some embodiments, the first and second players may be competing against each other in an episode race, and the second player data is that of a second player engaged in an instance of the game at a second computer device. The second player data may, therefore, be live data.

In other embodiments, the second player data, used to determine the relative position of the second player relative to the first player, may pre-stored data for access by the computer device. This second player data may be stored at a server, and can be accessed by the computer device when it is connected to the server to play the game in an online mode. The second player data may be derived from at least one live second player who played the second set of levels at an earlier time. The second player data may be derived algorithmically from player data from multiple players who have played the second set of levels at an earlier time.

The visual representation of the relative positions of players may comprise an arrangement of visual indicators representing respectively first and second player data arranged linearly in an order matching the order of the relative completion times in an episode race. The visual representation of the relative positions of the first and second players may be shown on the first set of levels, with the first player's position indicated by a non-ghosted visual indicator and the second player's position indicated by a ghosted visual indicator located at a level.

There may be multiple players, and the graphical representation of the first and second players may be shown in their relative positions with the relative position of at least one further player.

In some embodiments, a visual indicator may be displayed on the user interface to indicate to a first player that an episode race is available. The visual indication may be provided if it is determined that the first player has completed less than a certain proportion of the levels in the episode. The served may determine if this is the case when the computer device is connected to the server for the first player to play in an online mode.

In some embodiments, the first and second set of levels are the same. In other embodiments, the first and second set of levels are different.

Another aspect provides a computer device comprising: a graphical user interface; a processor configured to execute and to display on the graphical user interface a first set of levels of an episode of a game, the level playable in a predetermined sequence wherein access to the next level is granted on completion of the preceding level; and an input component configured to receive player inputs from a first player engaging with each of the levels, the processor configured to enable the game to determine when that level has been completed and to generate first player data indicating the level that the first player is engaged with, and to display on the graphical user interface a visual representation of relative first and second player positions in the first set of levels based on completion time of one or more level in the first set of levels indicated by the first player data relative to a completion time of one or more of the second set of levels indicated by a second player data which determines the second player position.

In some embodiments, a network interface is configured to connect the computer device to a server for play in an online mode and to receive second player data when in the online mode.

Another aspect provides a computer program comprising computer readable instructions stored on a non-transitory computer readable media, the computer readable instructions, when executed by a processor of a computer device, causing a method of controlling a graphical user interface of the computer device to be implemented, the method comprising: displaying for an episode race on the graphical user interface a first set of levels of an episode of a game, the game being executed by a processor of the computer device, the levels playable in a predetermined sequence wherein access to a next level is granted on completion of the preceding levels; at each of the levels, receiving player inputs from a first player engaging with that level, to enable the game to determine when that level has been completed and to generate first player data indicating the level that the first player is engaged with; and displaying on the graphical user interface a visual representation of the relative positions of the first and second players, based on relative completion times of one or more level indicated respectively by the first player data and by the second player data which determines the second player position.

BRIEF DESCRIPTION OF FIGURES

For a better understanding of some embodiments and to show how the same may be carried into effect, reference will now be made by way of example only to the accompanying drawings in which:

FIG. 11 shows an example of a sequence of windows that may be displayed when an invite to use the selected theme has been received at a device.

DETAILED DESCRIPTION OF EMBODIMENTS

Figure 1:
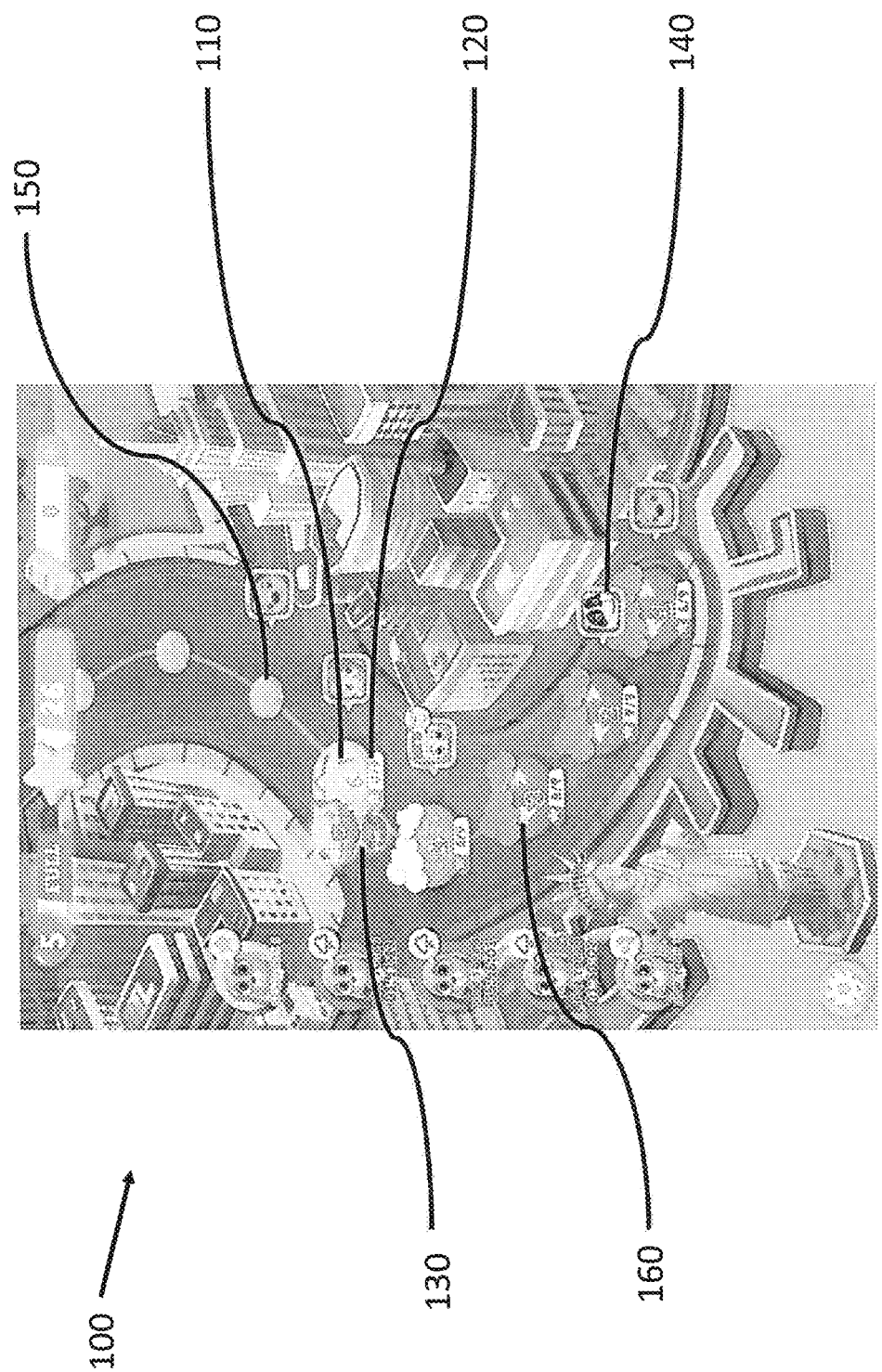
FIG. 1 shows an example of a level selection screen.

According to described embodiments of different aspects of the present invention presented below, three features are introduced. The first is a 'ticket to ride' feature which allows a user who is playing a game at his local device to select from more than one theme a theme in which to play an episode of a saga format game. Two or more selection screens may be provided to the user device from a group of possible options for that episode. For example, the selection screens may be selected randomly from the group. In existing saga formats, each theme is tied to a particular set of levels (episode). According to the 'ticket to ride' feature, the server is able to adjust the theme and provide the adjusted theme with different sets of levels, depending on which theme has been selected by a user There may be different groups of themes provided for different sets of levels, for example based on difficulty. In one embodiment, a first group may represent European cities associated with the first level of difficulty, and a second group may represent international cities, associated with levels of greater difficulty.

The feature can be used by itself or in conjunction with a second feature, 'travelling with friends'. According to this feature, a user who has access to a certain group of themes (and who may be selecting from those themes) can invite another user to play in that theme, even where the first user is playing levels of a different level of difficulty, and may not normally be entitled to play with that theme. Generally, the second user may be in a theme associated with more difficult levels, although this is not necessary. According to the 'travelling with friends' feature, users may therefore play at different levels of difficulty but with the same background display such that they may share the experience.

A third feature is an 'episode race' which allows a first player to compete against one or more players in an episode. The competing players could be 'live' or 'historic', as described later.

The embodiments described herein can be implemented in any suitable computer architecture. In one arrangement, the system comprises a game server which communicates via a communication network (such as the internet) with a plurality of user devices etc. It will readily be appreciated that in a real environment there could be a very high number of user devices in communication with the game server at any one time. Each user device is associated with a particular user or player. The server has a processor which can be implemented by one or more processing units. Furthermore, the functionality to be explained with respect to the game server could in reality be carried out in a distributed fashion amongst multiple servers, or even between the local user devices and the server. The present description is for ease of reference only in describing the functionality, and assumes that the game is implemented at a local device, for example in an executable which has been downloaded from the server.

A user may download a game executable at the time that he logs on to the server, or at subsequent log-in occasions. He may download a game executable once, and then receive updates at subsequent log-ins. The executable will contain information for rendering a map for that user, and game logic for allowing the user to play the game on or off-line. Certain features of the game are available on or off line, while other features are available only when the user device is on line—i.e in communication with the server. In some architectures, theme selection screens and level selection screens form part of the downloaded executable, so that certain features are available even when the device is off line.

Features involving tracking the progress of more than one player are generally only available when the devices of the players are on line.

It is understood that features described herein are not limited to any particular on line or offline arrangement. Furthermore, they may be implemented in other architectures, such as a web based architecture, where the game itself is implemented at the server.

In the new game format described herein, a viewable map is rendered on a user device on which it is possible to see a pre-set and fixed number of levels (or locations). The viewable map may be referred to as a level selection screen. The pre-set or fixed number of levels can be the maximum number of levels with which a player can engage. Each level is associated with a particular game board having particular game objectives, which are rendered for a user on the display of his terminal when he selects a location icon or node associated with a particular level. The fixed number of levels may be 100. In many display scenarios, it may not be possible to show all levels on the level selection screen at once, and therefore both fast panning and scrolling options are provided. At present, in a known Saga format, for example, described in our patent application Ser. No. 14/029,404 there is the concept of levels, wherein a player proceeds through the levels in sequence. A player must complete the game objective presented to him at each level before he can pass to the next level. At each level, he plays the game by himself. Continued engagement in the game is accomplished by providing more new levels as users require them. When continuously adding new levels, it can be a problem to enable the user to play a level of his choice as he has to scroll through 1000+ levels in some games. In Saga format games, a player's 'friends' can be rendered visible on the map at their last played level. The more levels which are added the less likely players are to see their 'friends' who are playing the same game as they are spread out over an ever-growing number of levels. On a small screen device, this particularly becomes a problem as only a limited number of levels can be displayed. A technical problem which arises is how to enable a user to more easily see his friends' progress on a small screen device when they are at different stages of a game.

The terms "user" and "player" are used interchangeably throughout to denote a person engaging with the game. The term "friend" or "contact" is used to denote another player/user who is in a contact graph with the present player/user on a social platform.

Figure 2:
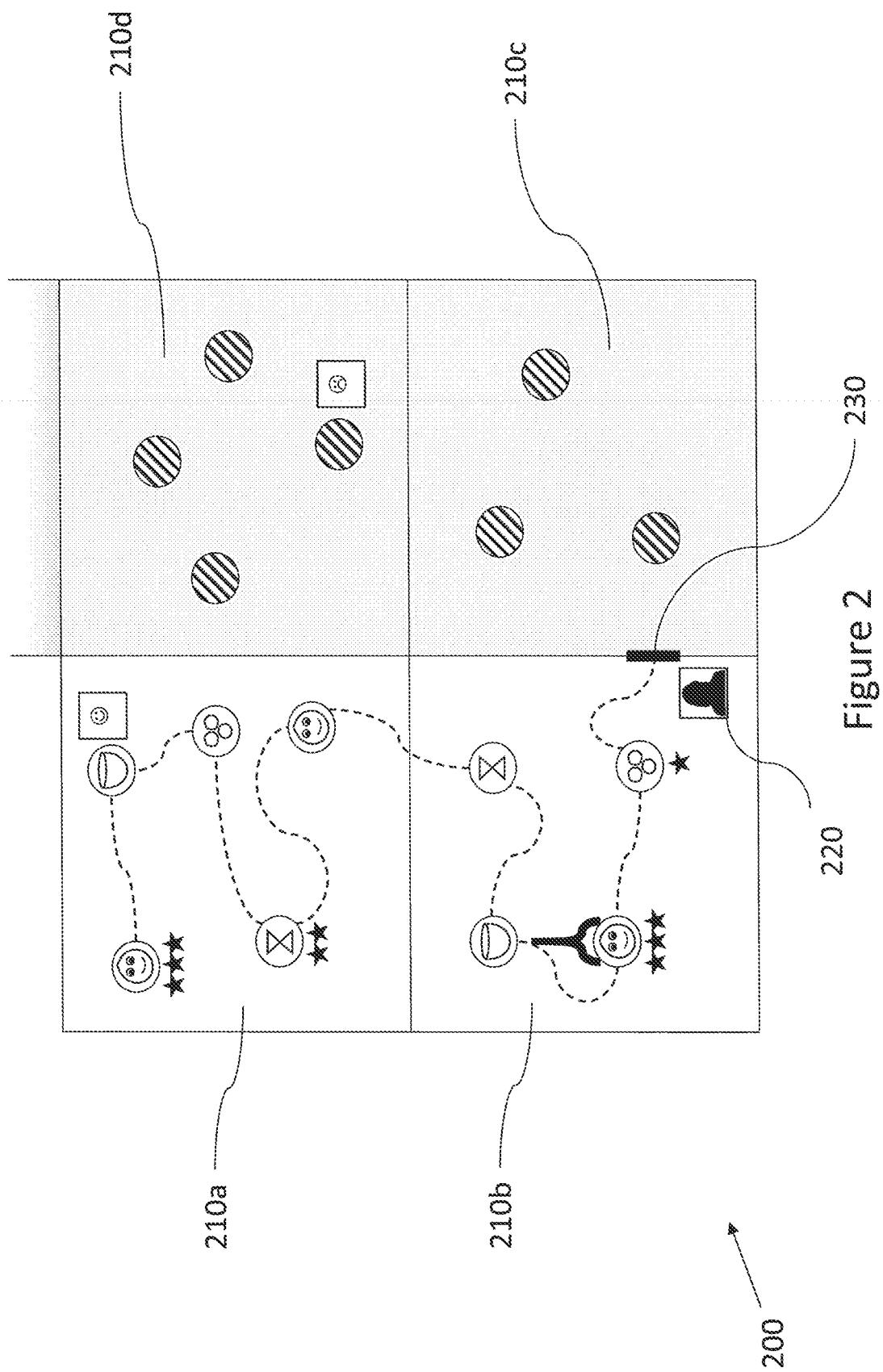
FIG. 2 shows an expanded view of a level map.

Reference is made to FIG. 2, which shows an expanded view 200 of the level map. As explained, the game comprises a plurality of levels. These levels may be divided up into sets of levels, which are played in different parts/episodes of the game. A level selection screen may, in some cases, only show a particular set of levels at any one time. In FIG. 2, a first set of levels is shown in a first part 210a of the level map. In this example, the first user has played and completed, all of the levels of the first set 210a of levels, and has also unlocked a second set 210b of levels in a different part of the level map. The second set 210b of levels may be of a harder difficulty than the first set 210a of levels. An identifier 220 of the first user is shown indicating the first user's progress in the game. The identifier 220 is shown at the end of the path of the second set 210b of levels. However, the third set 210c of levels of the level map has not yet been unlocked. A block 230 between the second set 210c of levels and the third set 210d of levels may be displayed on the level map 200. The block 230 may be referred to as a collaboration block. The block 230 may represent a challenge or task that the first user must perform so as to unlock the third set 210c of levels. A fourth set 210d of levels is also shown on the level map. This may be unlocked when the third set 210c of levels has been completed.

The level map may have a particular theme, which may be viewable to a user when the level selection screen is displayed on the user's device. The theme may be understood to define one or more of the particular graphics, colours, animations, and layout that are used for the level map. For example, one theme (e.g. New York) could be distinguished from another theme (e.g. Barcelona) by differences in the shapes of objects shown surrounding the level path of the level selection screen. In another example, one theme (e.g. Paris theme 1) could be distinguished from another theme (e.g. Paris theme 2) by the arrangements of the nodes representing the levels on the level map.

As may be understood from the explanation given above with respect to FIG. 2, a game may comprise a large number of levels. FIG. 2 shows an expanded view of a level map, having a large number of levels. However, when the level selection screen is displayed to the user, not all of the levels of the game are likely to be displayed at once. For example, the level selection screen may only show the levels of the second set 210b to the user. As explained previously, the more levels which are added to the game, the less likely players are to see the identifiers of 'friends' who are playing the same game, as they are spread out over an ever-growing number of levels. For example, if a first user is currently playing levels in the second set 210b of levels, whilst one of their friends has progressed to the fourth set 210d and another of their friends has progressed to only the first set 210a, the first user will not see the progress of their two friends since only levels from the second set 210b are shown on the terminal of the first user. A technical problem, therefore, arises, which is how to enable a user to more easily see their friends' progress on a small screen device when they are at different stages of a game, relative to their own.

According to examples of the application, the terminal of the first user may be configured to display an identifier of a second user if the second user is using the same theme for a level selection screen as the first user. Therefore, even if the first user and second user are at different stages of the game, and so different sets of levels having different difficulties, are displayed on the level map, the first user may be able to see the identifier of the second user on the level selection screen, and, therefore be able to determine the progress of the second user. The identifier of the second user may only be displayed on the level selection screen of the first user, if the second user has selected the same theme for the level selection screen as the first user. By only providing the second identifier on the screen when the theme is the same, the number of identifiers may be moderated so that not all of the first user's friends' identifiers are displayed on the screen simultaneously, thus obfuscating other information on the display.

According to examples of the application, the terminal of the first user may be configured to display an identifier of a second user at a relative position in the set of levels shown on the level selection screen on the device of the first user that reflects their game progress. For example, if the furthest level reached by a first user is a level (e.g. 25), which is part of a first set of levels (e.g. 21 to 40), whilst the furthest level reached by a second user is a level (e.g. 50), which is part of a second set of levels (e.g. 41 to 60), the identifier of the second user may be shown on the level selection screen on the device of the first user at the same relative position in the first set of levels as the second user has reached in the second set of levels. So, since the second user has reached level 50 in the second set, their identifier will be displayed to the first user at the node representing the level 30 in the first set. Therefore, if only the first set of levels are displayed on the level selection screen on the device of the first user, the first user will be able to see the second user's progress on the level selection screen.

Throughout the specification the terminal/device operated by a first user may be referred to as the "first device", whilst the terminal/device operated by a second user may be referred to as the "second device".

Figure 3:
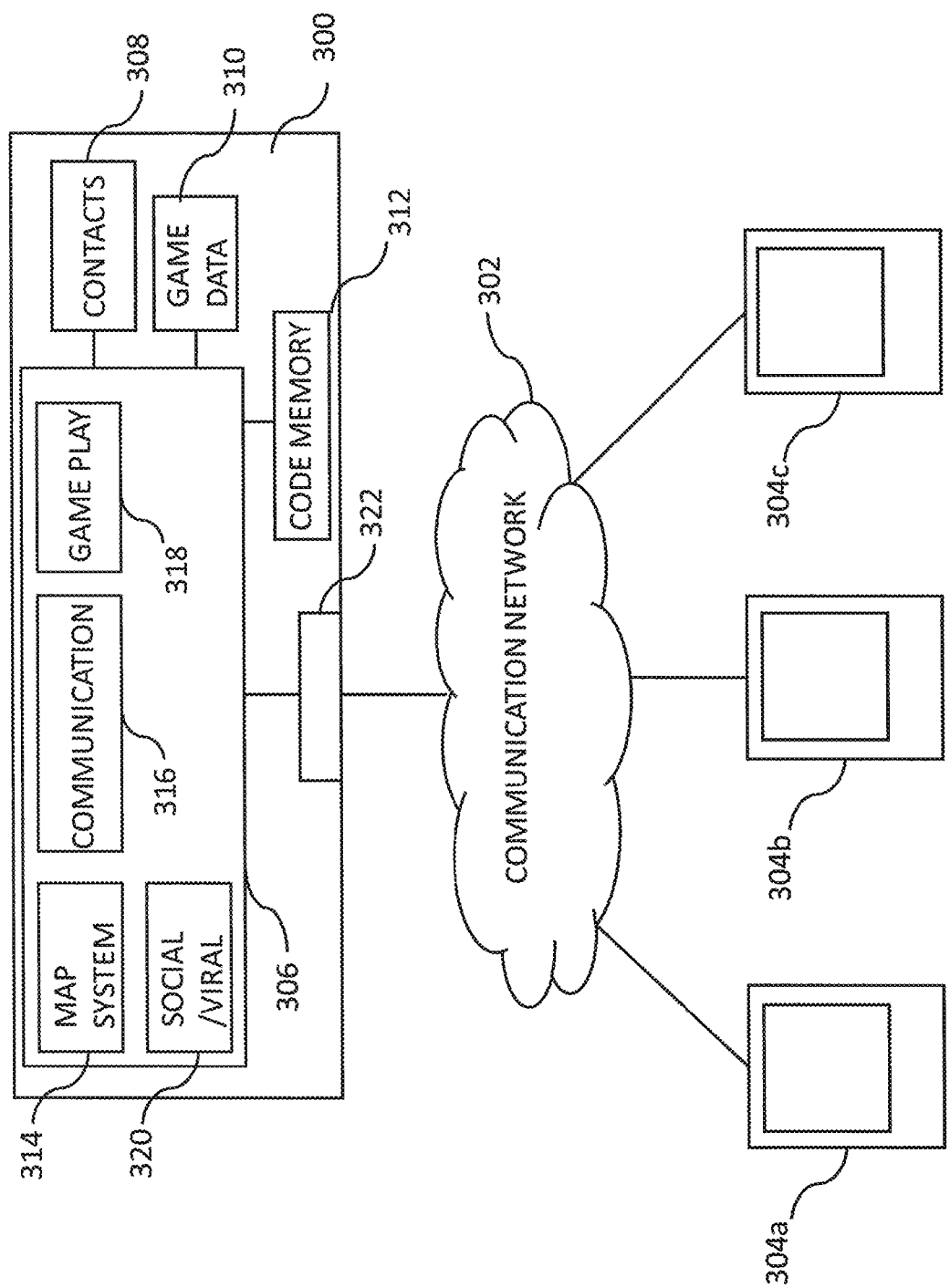
FIG. 3 shows a diagram of an example communication system.

FIG. 3 is a schematic diagram of a computer system for implementing some embodiments of the present invention. The system comprises a game server 300 which communicates via a communication network 302 (such as the internet) with a plurality of user devices 304a, 304b, 304c etc. It will readily be appreciated that in a real environment there could be a very high number of user devices in communication with the game server at any one time. Each user device is associated with a particular user or player. The server has a processor 306 which can be implemented by one or more processing units. Furthermore, the functionality to be explained with respect to the processor 306 in the game server 300 could in reality be carried out in a distributed fashion amongst multiple servers, or even between the local user devices and the server. The present description is for ease of reference only in describing the functionality, and assumes that the game is implemented at the server, e.g. in a web-based architecture. When the game is implemented at a local device, the modules are provided at the local device. The server 300 also comprises electronic storage in the form of computer memory. Two particular types of data are shown stored in separate computer memories—a contact memory 308 and a game data memory 310. However, it will be readily appreciated that these could be in the same or different memories, or indeed located at memories remote from the server and accessible thereto.

When implemented at the server, the processor 306 in combination with the memories 308, 310 implements the modules which are shown in the processor 306. These modules are implemented by computer code sequences which are executed by the processor 306. These code sequences can be stored in a code memory 312, at the server, or in any suitable place. When implemented at a local device, the modules are provided by a client which provides code sequences stored in a local memory. In that case, the server provides event data for events generated locally as described later.

'Play' is provided by providing executable computer code to the user device, with a game mode object for display on the map which renders the computer code accessible to a player when they select the game mode object on the map.

The server provides the normal function of a game server. That is, it has a network interface 322 which communicates with the communication networks 302 and via which a game executable can be downloaded to the user devices 304. A user may download a game executable at the time that he logs on, or at subsequent log-in occasions. He may download a game executable once, and then receive updates at subsequent log-ins. The executable will contain information for rendering a map for that user, and game logic for allowing the user to play the game on or off-line. For mobile devices, a game executable contains all the modules for playing the game offline, requiring access to the server only for event data. The map system 314 is responsible for generating for each user, a level map showing the levels that a user is able to play. A user can scroll through the map in on-line or off-line play. The map system module 314 may also be responsible for rendering the theme of the level selection screen. The map system module 314 may also be capable of causing dynamic events to be rendered. These dynamic events depend on game data received from the user devices, and to achieve this the map system module 314 interacts with the gameplay module 318, as will become clearer later. The map system module 314 is also responsible for generating new animations—these are animated icons which are rendered to a user on his display illustrating what has happened since the last time the user logged in. The map system module 314 is also responsible for rendering an endgame view, when all markers have been achieved at all levels.

The map system module 314 may also be responsible for notifying the friends of a user about that user's progress. This is a two way function. Firstly, it advises a particular user about the progress of the user's friends by showing the location of their most recent achievements. In this way, the achievements of active friends are highlighted. In addition, it provides to the friends of that user information about the current user's progress, similarly showing it on an animated map of those friends. To achieve this it requires access to the contact memory 308, which holds contacts for each particular user. The client can download data from the server. The client keeps a list of the logged in user's friends. The list entries contain information such as user id, name, e-mail, avatar (where available) etc. In addition a list of the aggregated progression of all friends is kept.

Figure 4:
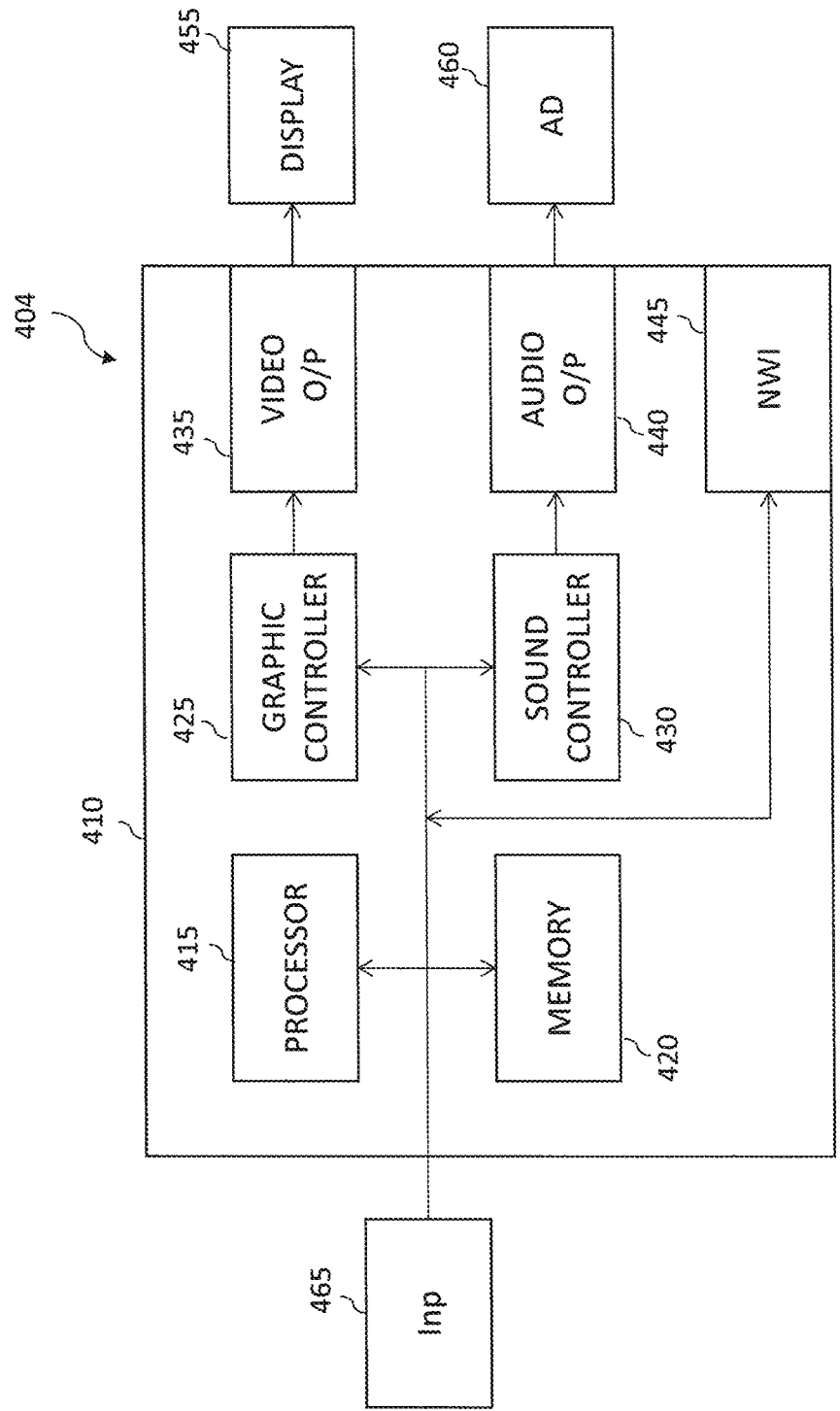
FIG. 4 shows an example of a user device.

A schematic view of a user or computing device 404 according to an embodiment is shown in FIG. 4. All of the blocks shown are implemented by suitable circuitry or computer code executed in a processor. The user device has a controller part 410. The controller 410 has one or more processors 415 and one or more memories 120. The control part 410 is also shown as having a graphics controller 425 and a sound controller 430. It should be appreciated that one or other or both of the graphics controller 425 and sound controller 430 may be provided by the one or more processors 415.

The graphics controller 425 is configured to provide a video output 435. The sound controller 430 is configured to provide an audio output 440. The controller 410 has an interface 445 allowing the device to be able to communicate with a network such as the Internet or other communication infrastructure.

The video output 435 is provided to a display 455. The audio output 440 is provided to an audio device 460, such as a speaker and/or earphone(s).

The device has an input device 465. The input device 465 can take any suitable format and can be one or more of a keyboard, mouse, touch screen, joystick or game controller. It should be appreciated that the display 455 may in some embodiments also provide the input device 165 by way of an integrated touch screen for example.

The blocks of the controller 410 are configured to communicate with each other via an interconnect such as a bus or any other suitable interconnect and/or by point to point communication.

It should be appreciated that in some embodiments, the controller 410 may be implemented by one or more integrated circuits, at least in part.

The user device 404 is shown by way of example only. In alternative embodiments, one or more of the parts may be omitted. Alternatively or additionally, some embodiments may comprise one or more other parts. Alternatively or additionally, one or more parts may be combined.

This user device 404 may be a user device 304a, 304b, 304c as shown in FIG. 3. The game server 300 may communicate via the network 320 with the one or more user devices 304a, 304b, 304c and may further provide connections to a social network such as Facebook™. The server 300 may be able to obtain user information via the social network. Such user information may include contacts of the user.

It should be appreciated that embodiments may be deployed in different system architectures. For example, the computer game may be implemented as a computer game that is stored in the memory 420 of the user device 404 and is run in particular group and social modes on the processor 415 of the user device 404. However when online, the server 300 may handle some elements of the game in some embodiments. By way of example only, a Java game applet may be provided to the user device 404 and the locally running Java applet will generate, for example, the graphics, sounds, and user interaction for the game play on the user device 404. Java applet can have sufficient information to allow offline play when the user device 404 is no longer in communication with the game server 300, e.g. if connectivity is lost. When online, data may be fed back to the server 300 to allow interaction with other user devices 304, as in the group and online social modes.

In some embodiments, the game may be implemented as a computer program that is stored in a memory of the system, for example the server 300, and which runs on the processor 306 of the game server 300. Data streams or updates are supplied to the user device 404 to allow the user device 404 to render and display graphics and sounds in a browser of the user device 404.

In the following description, the first device and the second device may each be a device 404 as described above with respect to FIG. 4. The first device may be a device 304a in communication with the server 300 as shown in FIG. 3, whilst the second device may a device 304b in communication with the server 300 as shown in FIG. 3. The server referred to in the following description in communication with the first and second device may be the server 300 as shown in FIG. 3.

Figure 5:
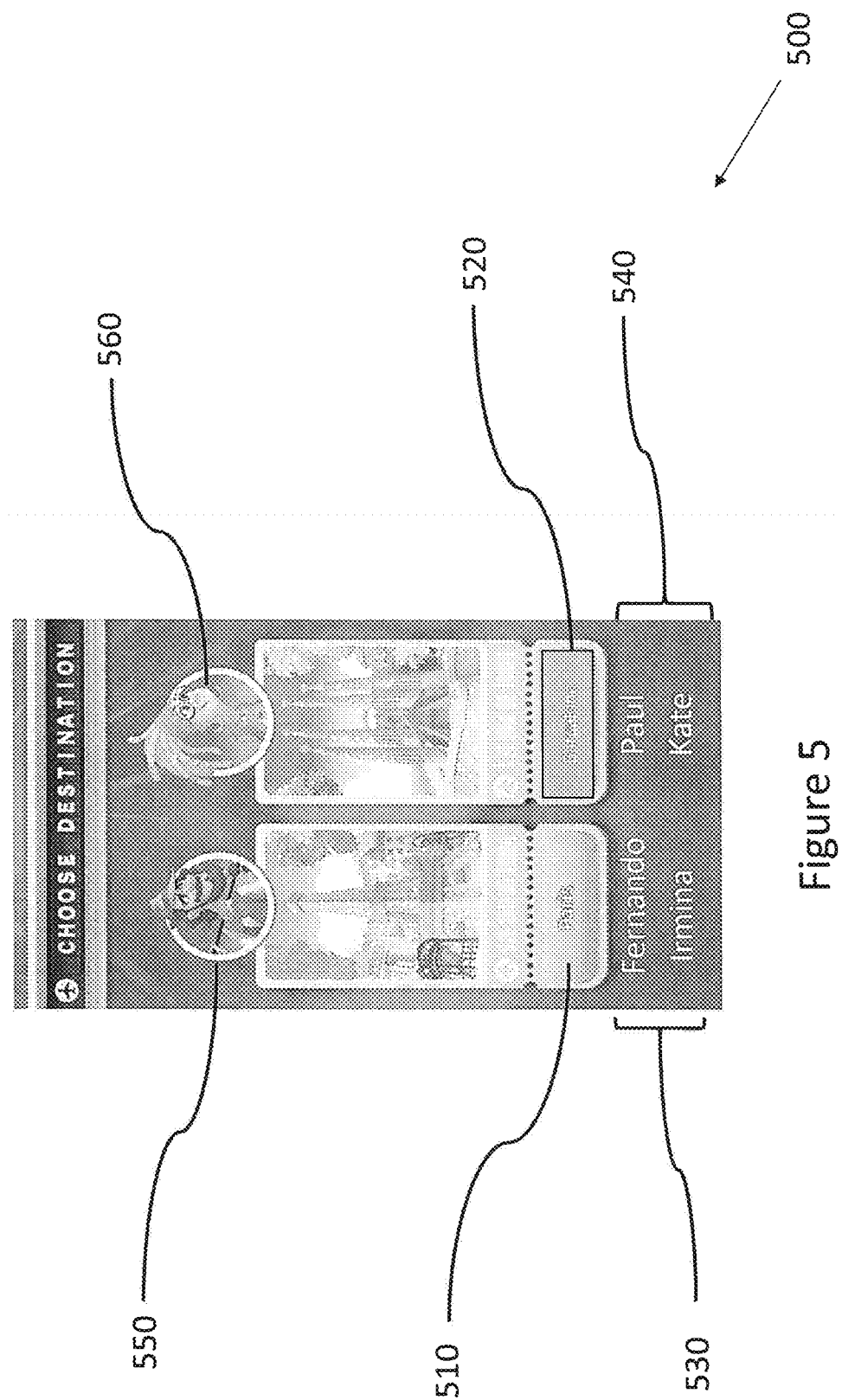
FIG. 5 shows an example of a theme selection screen which may be shown to the user.

Reference is made to FIG. 5, which shows an example of a screen 500 that may be displayed on the display of a device of a first user. This screen 500 allows, the first user to select a theme to be used for the level selection screen, which is displayed and which allows the first user to select a level of the game for play, as described previously. The theme determines the graphics of the level selection screen. The theme may comprise the particular background objects that are shown on the level selection screen, any animations shown on the level selection screen, the design of the nodes representing the levels, the positioning of the nodes representing the levels. By selecting a theme for the level selection screen, these factors may be controlled by the first user. The particular levels which may be selected for play, may be independent of the theme selected. For example, the level selection screen could show a set of 20 nodes, representing the levels 21-40, irrespective of the theme selected. Therefore, the same levels are available for play by the first user irrespective of the theme, which they select.

In the example shown in FIG. 5, there are two choices for the theme for the level selection screen from which the first user may choose. As shown, a first choice for the theme is the Paris theme. The first user may select the Paris theme by user input at the appropriate part 510 of the screen. A second choice for the theme is the Barcelona theme. The first user may select the Barcelona theme by user input at the appropriate part 520 of the screen. The processor of the first device detects the user input and loads the appropriate theme that has been selected. The processor may also control the network interface of the first device to transmit an indication of the selected theme to a server. As will be described, this indication can be used to notify devices of friends of the user, which may respond by displaying an identifier of the first user at the appropriate position on a level selection screen when the same theme is used.

Also shown in FIG. 5 are indications 530, 540 of other users who are using the respective themes for a level selection screen. The indications 530, 540 may be received from a server by the first device. The indications 530, 540 may indicate the first user's friends who are using the themes. For example, for the theme "Paris" the indications 530 show that the first user's friends "Fernando" and "Irmina", are using the "Paris" theme for a level selection screen. On the other hand, for the theme "Barcelona", the indications 540 show that the users "Paul" and "Kate" are using the "Barcelona" theme for a level selection screen. Thereby, the first user is able to see which of their friends are playing with which theme and this is able to inform their choice.

In some cases, the indications 530, 540 may displayed as the names of users. In other cases, the indications 530, 540 may be provided as visual indicators or avatars. In some examples, the indications 530, 540, may be provided in a scrollable list.

In some examples, not all of the first user's friends may be displayed on the indications 530, 540 on the level selection screen. In other cases, only a subset of the user's friends may be displayed. The first device may receive an indication of the friends who are most active (i.e. who the play the game the most) and may use this indication to select a subset of friends to display on the level selection screen. The first device may display the friends who are the most active on the theme selection screen 500. In other examples, the first device may determine to display friends who have used the same theme as the first user previously.

Also shown on the theme selection screen are indicators 550, 560 of characters, which may be part of a theme if their associated theme is selected. For example, the character 550 may be displayed on the display of the first device on the level selection screen if the Paris theme is selected. On the other hand, the character 560 may be displayed on the display of the first device on the level selection screen if the Barcelona theme is selected.

Figure 17:
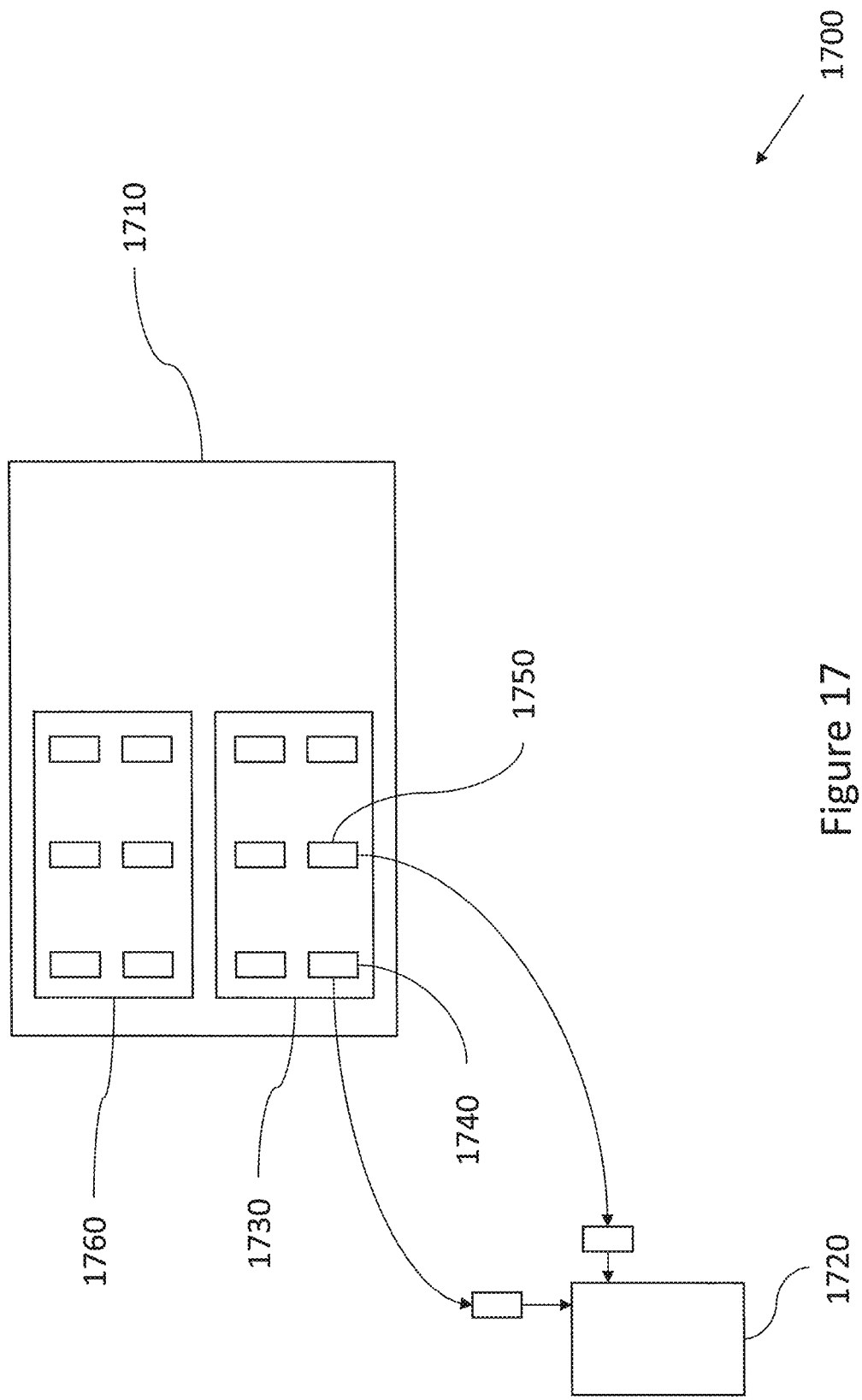
FIG. 17 shows a diagram of an example communication system.

Reference is made to FIG. 17, which shows the interaction between a server 1710 and a first user device 1720 that may occur in the selection of a theme for a level selection screen displayed on the display of the first user device 1720. The server 1710 may be the same as the server 300 described with respect to FIG. 3. Likewise, the first user device may be the same as the user device 404 described with respect to FIG. 4.

The server 1710 (or a database associated with the server) may store at least one set of themes for use on the level selection screen. For example, a first set 1730 of themes may be stored by the server 1710. The figure shows that the first set 1730 comprises a plurality of themes, for example a first theme 1740 and a second theme 1750. The first set of themes may be themes for use on a level selection screen for selecting a level from a first set of levels (i.e. a first episode) of the game. The server may also store a second set 1760 of themes for use on a level selection screen for selecting a level from a second set of levels (i.e. a second episode) of the game. In some cases, one or more levels of the second set may be the same as the one or more levels of the first set.

Prior to the display of the level selection screen with a chosen theme on the display of the first user device 1720, the server 1710 may select a plurality of themes from a set of themes and transmit an indication of the selected theme to the first user device. As shown in FIG. 5, the first user device may then make a selection from the selected themes as to which theme to use for the level selection screen.

For example, the server 1710 may receive from the first user device 1720 a request for one or more themes to be displayed for a level selection screen. The server 1710, either from its own database or from an indication received from the first user device 1720, may determine that a first set of levels is to be displayed on a level selection screen on the first user device 1720. The first server may then select a plurality of themes from the first set 1730 of themes. The first server 1710 may select two themes, for example first theme 1740 and second theme 1750, from the first set 1730 of themes. The plurality of themes may be selected at random from the first set 1730 of themes. The first server then transmits an indication of the selection of the plurality of themes to the first user device 1720.

The first user device 1720 receives the indication of the plurality of themes, the processor of the first user device 1720 being configured to control the display of the first user device 1720 to provide an option to the first user of a theme to select for the level selection screen. For example, the screen 500 as illustrated in FIG. 5 could be displayed on the screen of the first user device 1720. In this case, the first theme 1740 could be Paris, whilst the second theme 1750 could be Barcelona. In response to user input associated with one of the plurality of themes indicated on the display of the first user device 1720, the processor of the first user device 1720 is configured to display the level selection screen having the first set of levels with the one of the plurality of themes.

When the first user has progressed in the game to a second set of levels, the server may determine that the first user has progressed to the second set of levels, e.g. by receiving an indication from the first user device 1720. In response, the server 1710 may then select a plurality of themes from the second set 1760 of themes and transmit an indication of the selection to the first user device 1720. The first user device 1720 then, as for the first set of levels, allows the user to select one of the plurality of themes of the second set for use on the level selection screen for selecting from the second set of levels. In some cases, the server may be configured to not select a theme from the second set 1760 of themes that was used for the level selection screen showing the first set of levels.

Figure 6:
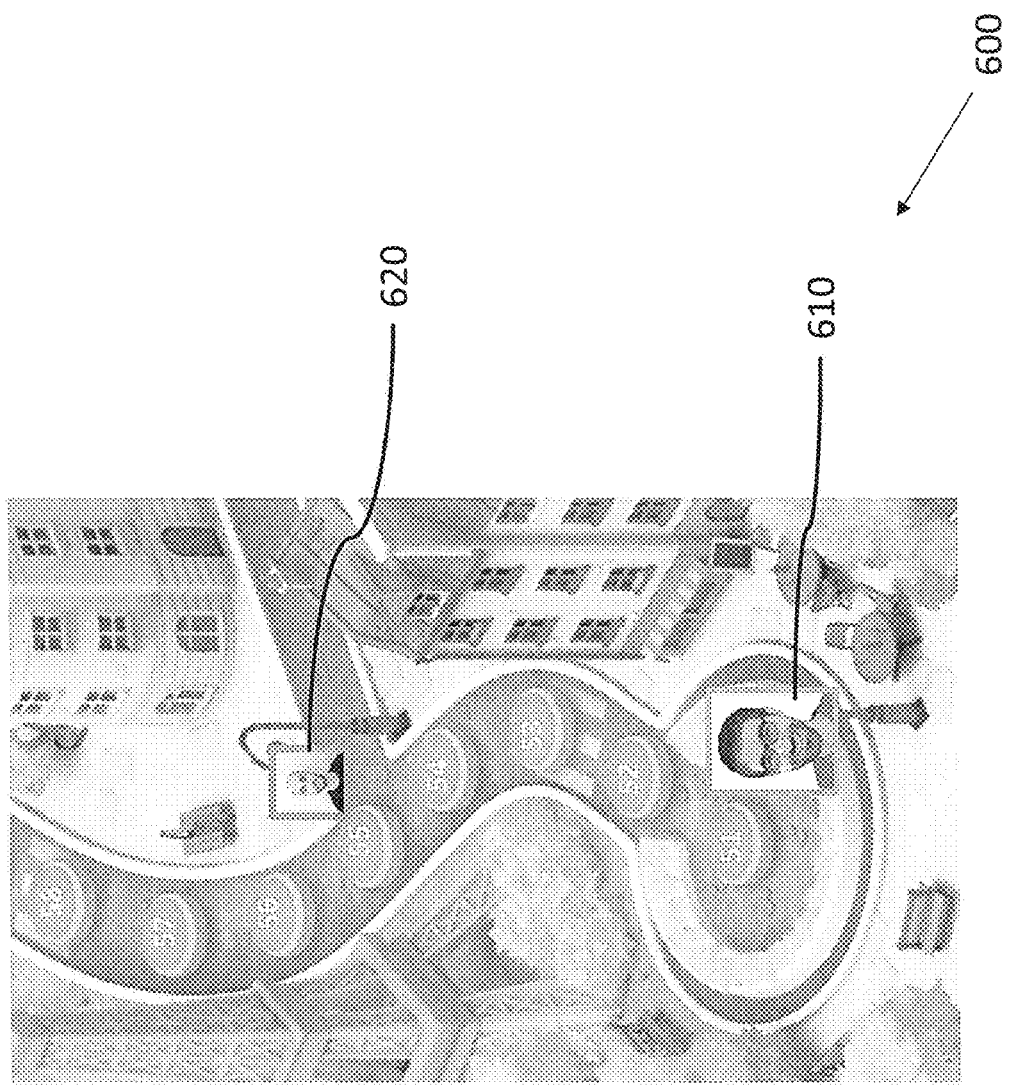
FIG. 6 shows an example of a level selection screen.

Reference is made to FIG. 6, which shows a level selection screen 600, which may be loaded from memory for display on the display of the first user's device, when the first user has selected the Paris theme. The level selection screen comprises a first set of nodes, which represent a first set of levels from which the user may select a level for play. Specifically, in this example, the nodes displayed on the level selection screen are numbered from 51 to 58, and represent the levels 51 to 58. The processor of the first device may be configured to load the relevant identifiers 610, 620, and progress information of the first and second users from memory and control the display to show the level selection screen of FIG. 7.

Shown on the level selection screen 600 is an identifier of the first user 610. This identifier 610 may be shown at a position indicating the progress of the first user in the first set of levels shown on the level selection screen. For example, the identifier 610 may be shown at the node 51 if the first user has unlocked but not completed, level 51 of the game.

Also shown on the level selection screen 600 is an identifier 620 of a second user of the game. The second user may be a social network contact/friend of the first user who plays the game on a separate terminal (referred to as a second device). The identifier 620 may be shown at a position indicating the progress of the second user in the game. The device of the first user may be configured to receive an indication of the game progress of the second user, and use this indication to determine the position of the second user in the level selection screen 600. The relative position of the identifier 620 in the first set of levels on the first level selection screen 600 may be the same as the relative position of the identifier of the second user in a second set of levels shown on a second level selection screen on the terminal of the second user. This may be understood by considering FIG. 7, which shows a level selection screen 700, which may be displayed on the display of the second user's device, when the second user has selected the Paris theme.

Figure 7:
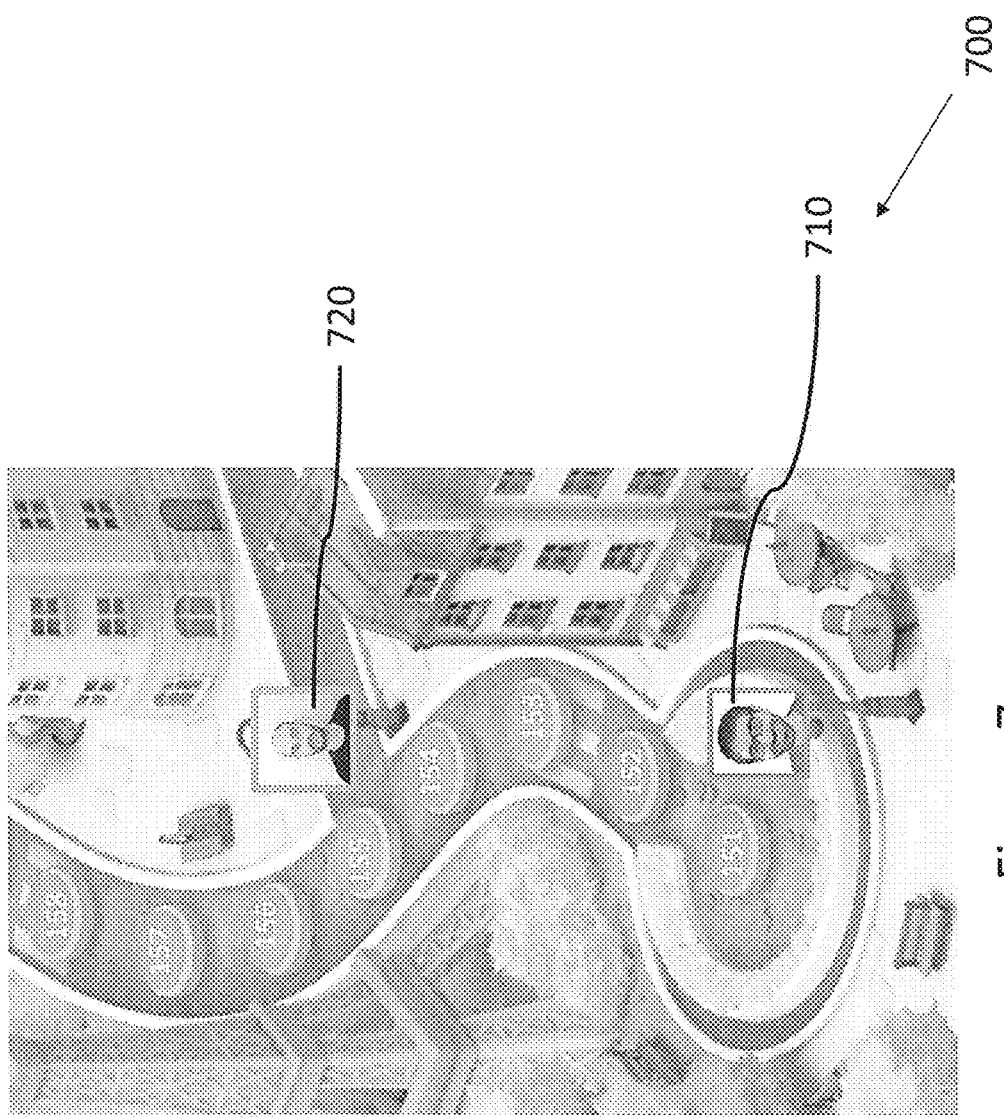
FIG. 7 shows an example of a level selection screen.

In FIG. 7, the level selection screen 700 comprises a second set of nodes, which represent a second set of levels from which the user may select a level for play. Specifically, in this example, the nodes displayed on the level selection screen are numbered from 151 to 158, and represent the levels 151 to 158. The processor of the second device may be configured to load the relevant identifiers 710, 720, and progress information of the first and second users from memory and control the display to show the level selection screen of FIG. 7.

Shown on the level selection screen 700 is an identifier 720 of the second user of the game. This identifier 720 is shown at a position indicating the progress of the second user in the second set of levels shown on the level selection screen. For example, the identifier is shown at node 155, which may indicate that the second user has unlocked, but not completed level 155, and that this is the furthest level in the game that has been reached.

The position of the identifier 720 in this second set of levels shown on the level selection screen 700 represents the true progress of the second user. The position of the identifier 620 does not represent the true progress, since in FIG. 6, the identifier 620 is shown at node 55, despite the fact that the second user has progressed to node 155. However, as may be seen by comparing FIGS. 6 and 7, the identifier 620 of the second user has the same relative position in the first set of levels displayed on the display of the first device as the identifier 720 of the second user in the second set of levels shown on the display of the second device. Therefore, the first user may play the game at the first set of levels and watch the progress of their friend across the level map when they play in the same theme together, even though the second user is playing levels (i.e. those of the second set) of a harder difficulty level than the first user.

FIG. 7 also shows an identifier 710 of the first user on the level selection screen 700 shown to the second user. The identifier 710 of the first user is shown in the same relative position in the second set of levels shown on level selections screen 700 as the identifier 610 of the first user in the first set of levels shown on level selection screen 600. Therefore, the second user may play the game at the second set of levels and watch the progress of their friend across the level map when they play in the same theme together, even though the first user is playing levels (i.e. those of the first set) of an easier difficulty level than the second user.

In FIGS. 6 and 7, when the identifiers of a user's friends are displayed on the level selection screen, these identifiers are shown as being physically smaller than the identifier of the user themselves. This gives prominence to the user's own identifier over their friends' identifiers. In addition to the size difference between the user's identifier and their friends' identifiers, there may also be a difference in colour between the identifiers. The difference in colour could be a difference in the colour of the border of the identifiers. For example, on the level selection screen 600 shown on the display of the first device, the identifier 620 of the second user is shown as being smaller than the identifier 610 of the first user themselves. Furthermore, the identifier 620 of the second user is shown with a red border, whilst the identifier 610 of the first user is shown with a green border. Similarly, on the level selection screen 700 shown to the second user, the identifier 710 of the first user is shown as being smaller than the identifier 720 of the second user themselves. Furthermore, the identifier 710 of the first user is shown with a red border, whilst the identifier 720 of the second user is shown with a green border. However, as may be seen from FIGS. 8 and 9 alternative or additional techniques may be employed to give prominence to the identifier of the user themselves over those of their friends. Specifically, the identifiers representing a user's friends may be blurred or made semi-transparent.

Figure 8:
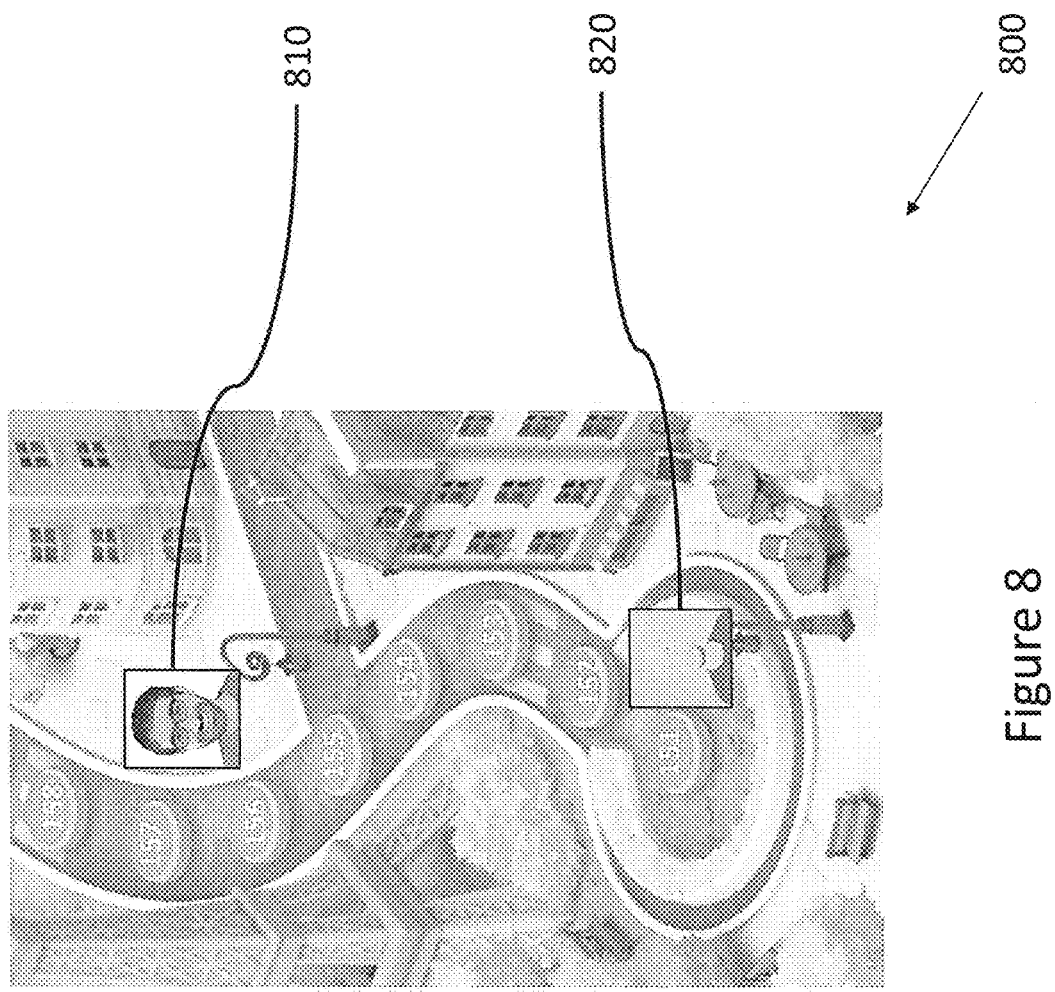
FIG. 8 shows an example of a level selection screen.

FIG. 8 shows an example of a level selection screen 800, which may be displayed on the device of a first user. Identifier 810 of the first user is positioned at node 156, and an identifier 820 of the second user positioned at node 151. The identifier 820 of the second user is shown as being blurred, so as to provide it with less prominence than the identifier 810 of the first user. The identifier 820 may be referred to as a 'ghost' identifier, with reference to this effect.

Figure 9:
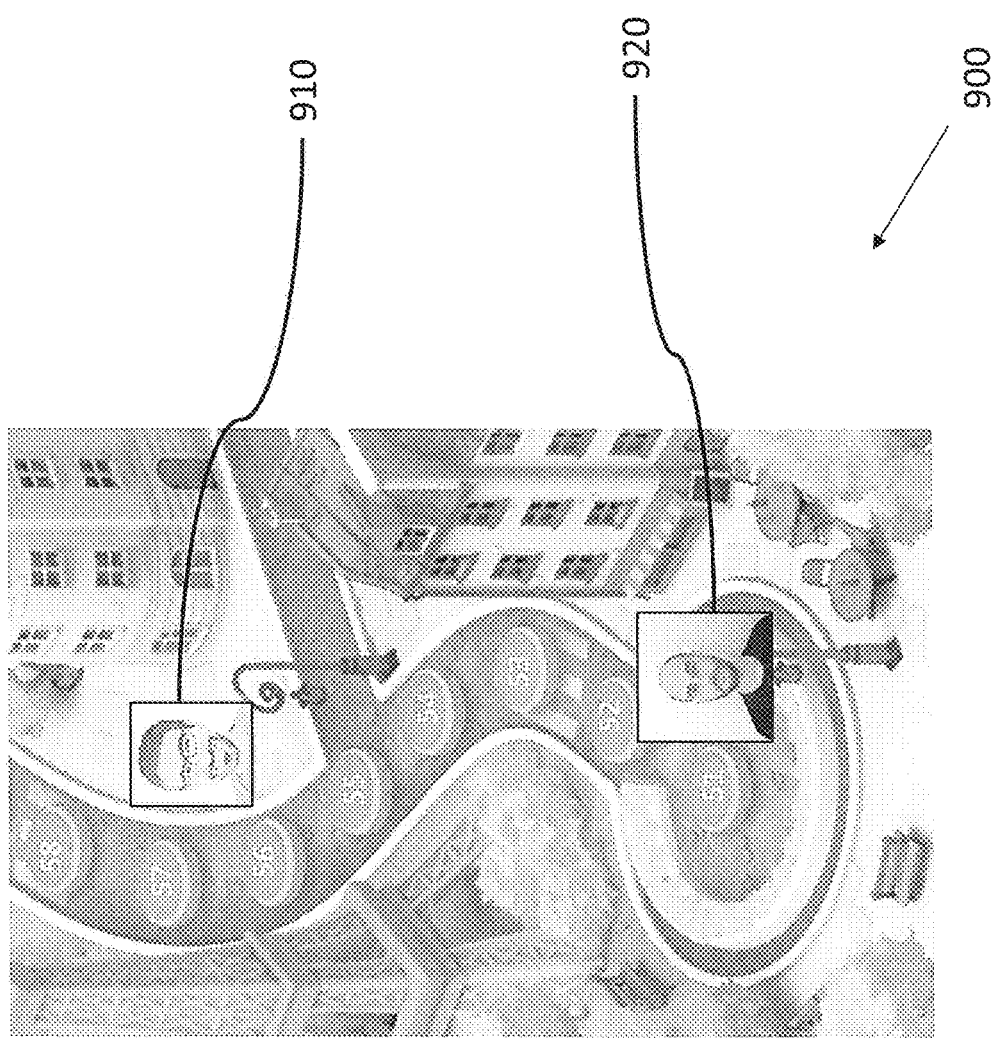
FIG. 9 shows an example of a level selection screen.

FIG. 9 shows an example of a level selection screen 900, which may be displayed on the device of the second user. An identifier 910 of the first user positioned at node 56, and an identifier 920 of the second user positioned at node 51. The identifier 920 of the first user is shown as being semi-transparent, so as to provide it with less prominence than the identifier 920 of the second user. The identifier 910 may be referred to as a 'ghost' identifier, with reference to this effect.

Figure 10:
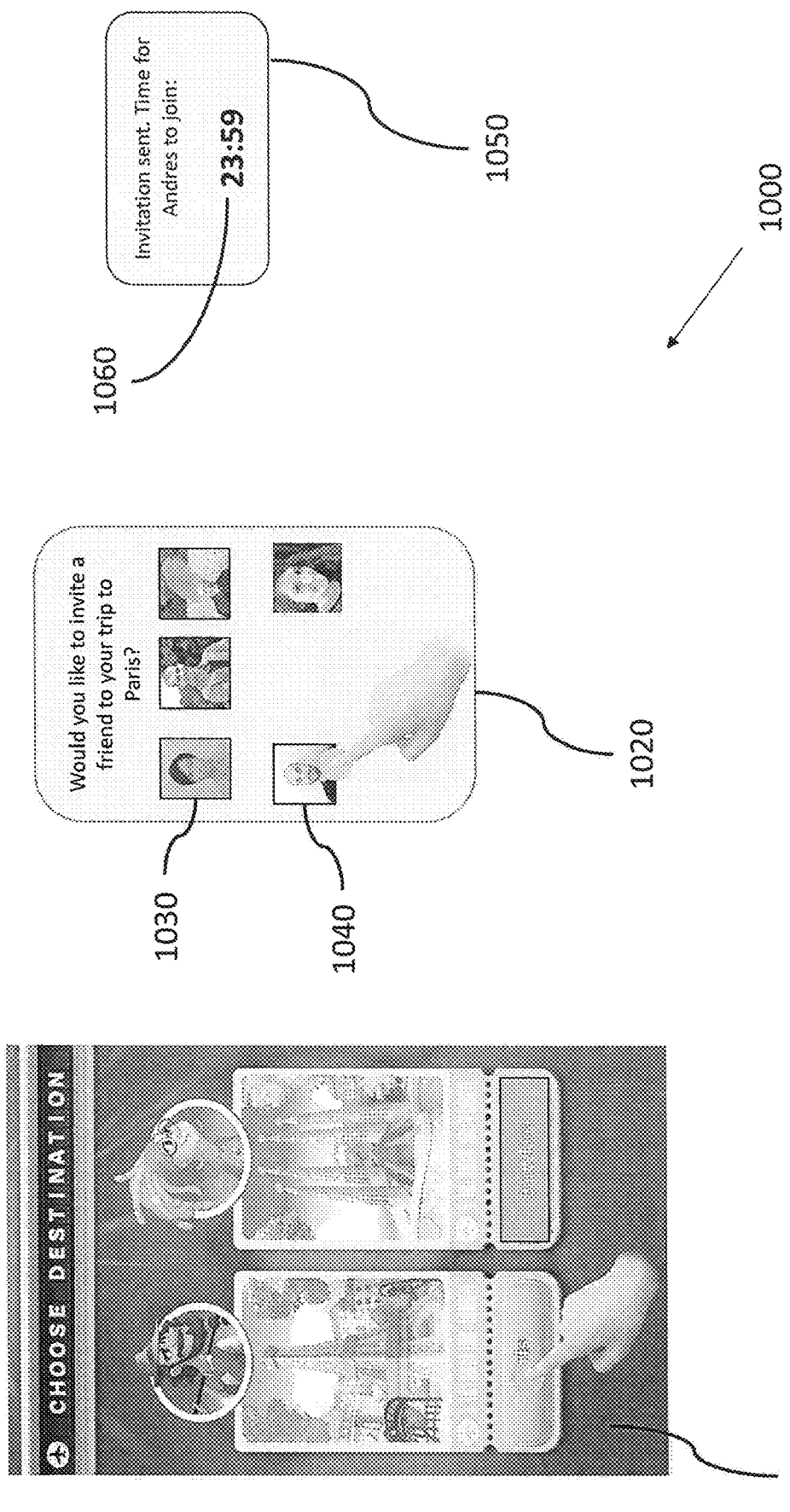
FIG. 10 shows an example of a sequence of windows for inviting a user to use the selected theme.

Reference is made to FIG. 10, which shows one possible mechanism that may be used to enable a player and their friends to use the same theme, and so to observe each other's progress in an environment where display resources are limited. FIG. 10 shows a series 1000 of windows that may be displayed sequentially so as to illustrate a process in which a first user may invite a second user to use the same theme for a level selection screen.

Firstly, the window 1010 is displayed on the display of the first user's device, allowing the first user to select a theme for the level selection screen. As previously, the first user has a choice between Paris and Barcelona. As shown in FIG. 10, the first user selects Paris by making user input associated with the 'Paris' icon shown on the display.

The processor of the first device is configured to, after the first user has made the selection of the theme for the level selection screen, control the display to show a second window 1020. The second window 1020 comprises a set of identifiers, e.g. identifier 1030, wherein each identifier is associated with a friend of the first user. The first user may select one of their friends from this window 1020 to invite the selected friend to use the same theme for the level selection screen as was selected by the first user. In the particular example, the first user selected the Paris theme when the window 1010 was displayed. Therefore, the window 1020 provides the option to invite a friend to also use the Paris theme.

The identifiers, e.g. identifiers 1030, 1040, that are shown in the window 1020 may be selected according from the first user's friends list. The friends list may be filtered according to certain criteria so as to select certain identifiers of friends to show on the window 1020 for the invite. For example, the first device may receive an indication of users that have used the theme (in this case Paris) of the invite for a level selection screen previously. If the users have used the theme for the level selection screen previously, the processor of the first device may determine that those users' identifiers are not to be shown on the window 1020 as suggestions for the invite.

If the first user opts to invite a friend to use the same theme for the level selection screen by making user input associated with one of the identifiers, e.g. identifier 1040, shown in window 1020, the device of the first user is configured to transmit an invitation via a server to a user device of the selected user (who will be referred to as the 'second user').

If the first user opted to send an invitation to the second user for them to use the selected theme, a third window 1050 may be displayed on the display of the first user's device. The third window 1050 displays a time limit or countdown 1060. Once the time limit 1060 expires, the invitation that was sent for the second user to use the same theme as the first user is no longer valid, and the second user can no longer respond to the invitation by adopting the same theme as the first user.

Reference is made to FIG. 11, which shows a series of windows that may be displayed on the display of the second user's device, when an invite is sent by the first user to the second user. The device of the second user may be configured to receive the invite at its network interface via a server from the device of the first user.

Firstly, a first window 1110 may be displayed on the screen of the second user's device. This first window 1110 comprises a message inviting the second user to use the same theme as the first user. In some cases, the processors of the second user's device may determine that the second user is not able to respond to the invite by adopting the theme which they have been invited to adopt until they have completed a set of levels shown on the level selection screen using a different theme. This set of levels may be currently in play when the invite message is received by the second device. For example, a second window 1120 is displayed on the display of the second device, and shows a level selection screen, where the theme is Venice. The second user may be required to complete the levels shown on this level selection screen in order to adopt the theme, which they have been invited to adopt prior to the expiry of a time limit 1130. This time limit 1130 may be the same as the time limit 1060 shown on the display of the first device. The time remaining may be calculated by a server and transmitted to the first user device and the second user device, for display on the screens of the respective user devices.

A third window 1140 may be displayed on the screen of the second device. In some cases, this third window 1140 may only be displayed after the second user has completed a set of levels (as illustrated by window 1120). In response to user input associated with the relevant part 1150 of the third window 1140, the processor of the second device is configured to control the display to show a level selection screen, such as level selection screen 700 shown in FIG. 7 or level selection screen 900 shown in FIG. 9, having the theme which was indicating in the invitation. The third window 1140 may include an indication 1160 of the invite. This indication 1160 may comprise an identifier of the first user who sent the invite to use the theme, and the indication 1160 may be shown associated with the theme which the second user has been invited to use.

If the processor of the second device determines that the time limit has expired without the theme of the invitation being selected, the processor may record an indication in the memory of the second device. In this case that the time limit has expired, the display of the second device may be controlled to show a default theme selection screen, without an indicator of the invite. In this case, the themes on the default theme selection screen from which the second user may be permitted to select may be chosen as explained above with reference to FIG. 17. They may be chosen at random with no dependence upon the theme of the invite. A possible theme selection screen 500 is shown in FIG. 5. In some cases, the theme selection screen may permit a choice of theme (e.g. Paris 510) that is the same as the choice of theme, which the second user was invited to use. In other cases, the theme selection screen may provide a choice to the second user of different themes than the theme which the second user was invited to use.

The invitation that is transmitted to the second device may allow the second user to use a theme for a level selection screen even if the second user has not unlocked the levels normally associated with that theme. As was explained above, with reference to FIG. 17, a server may store a first set of themes 1730 associated with a first set of levels (which are earlier in the game) and a second set of themes 1760 associated with a second set of levels (which are later in the game). Suppose that the second user has progressed as far as the first set of levels, but has not unlocked the second set of level. In this case, normally the second device would not display the second set of themes as options to use for the level selection screen. However, in the case that the first user has progressed to the second set of levels and is using a theme from the second set of themes, the first device may transmit an invitation to the second device to use the theme from the second set of the themes. If the second user makes the appropriate user input to select this theme from the invitation, as illustrated above, the theme from the second set of themes may be used for a level selection screen for selecting from a first set of levels on the second device.

FIG. 17 above describes how the user device may receive an indication of two or more themes from a set of themes from which a user may make a selection. FIGS. 10 and 11 describe how a choice of theme may be presented to a second user in dependence upon an invite received from the first user. Alternatively or additionally, a predefined set of themes may be presented to a user at predefined points in the game. The first device may determine that a specific level has been reached in the game, and in response load indications of a predefined selection of themes on the display from which the first user may select a theme to use for the level selection screen. For example, when the first user reaches level 500, a first set of themes from which the first user may select may be displayed. This first set may be predefined such that it is the same for any other users of the game who reach level 500. When the first user then reaches level 1000, a second set of themes from which the first user may select may be displayed. In some cases, a predefined set of themes may be offered as options on a theme selection screen in response to determining an anniversary event or other trigger event. The predefined set of themes may be offered in dependence upon a time dependent factor. For example, a predefined set of themes may be offered in response to the first device determining that it is 'Christmas day'.

Figure 16:
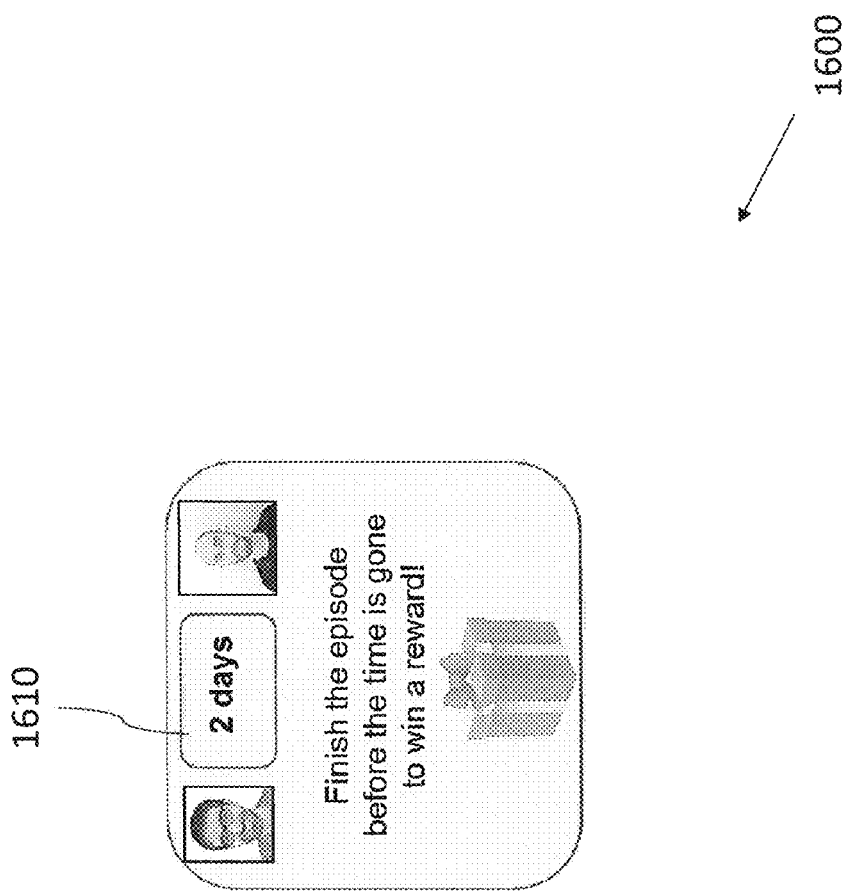
FIG. 16 shows an example of a reward window.

Reference is made to FIG. 16, which shows an example window 1600, which may be displayed on the displays of both the first device and the second device when the users of the two devices are using the same theme for a level selection screen. In some cases, this may only occur when one user has invited another to use the selected theme. In other cases, this may occur when it is determined that two or more users (who are friends) happen to be using the same theme. As shown, a time limit 1610 may be shown on the displays within which the first user and the second user must complete the sets of levels shown on the level selection screen in order to receive an award. For example, if the first user completes the first set of levels prior to the time limit 1610 expiring, the first device may receive an indication that a reward (such as an in-game item) is to be associated with the first user's account. On the other hand, if the second user finishes the second set of levels prior to the time limit 1610 expiring, the second device may receive an indication that a reward (such as an in-game item) is to be associated with the second user's account. In some cases, both the first and second user must complete the first and second set of levels, respectively, in order for a reward to be made. If both complete their respective set of levels, the first and second device may receive indications that a reward is to be associated with the first and second user accounts, respectively. The amount of time of the time limit 1610 remaining may be calculated by a server and transmitted the respective user devices. Thereby, the user devices may determine if the time limit has expired.

In some examples, two or more users who are using the same theme for the level selection screen may compete against one another to complete the set of levels shown on their level selections screens first. Such a mode may be referred to as an episode race. A first user may compete against a second user (who they have invited to use the same theme) to complete a first set of levels shown on their level selection screen before the second user completes a second set of levels shown on their level selection screen. In some examples, an invite is not necessary and a first user may compete against any of their friends who are using the same theme for a level selection screen. The user who completes the levels shown on their level selection screen first may receive a reward.

Figure 12:
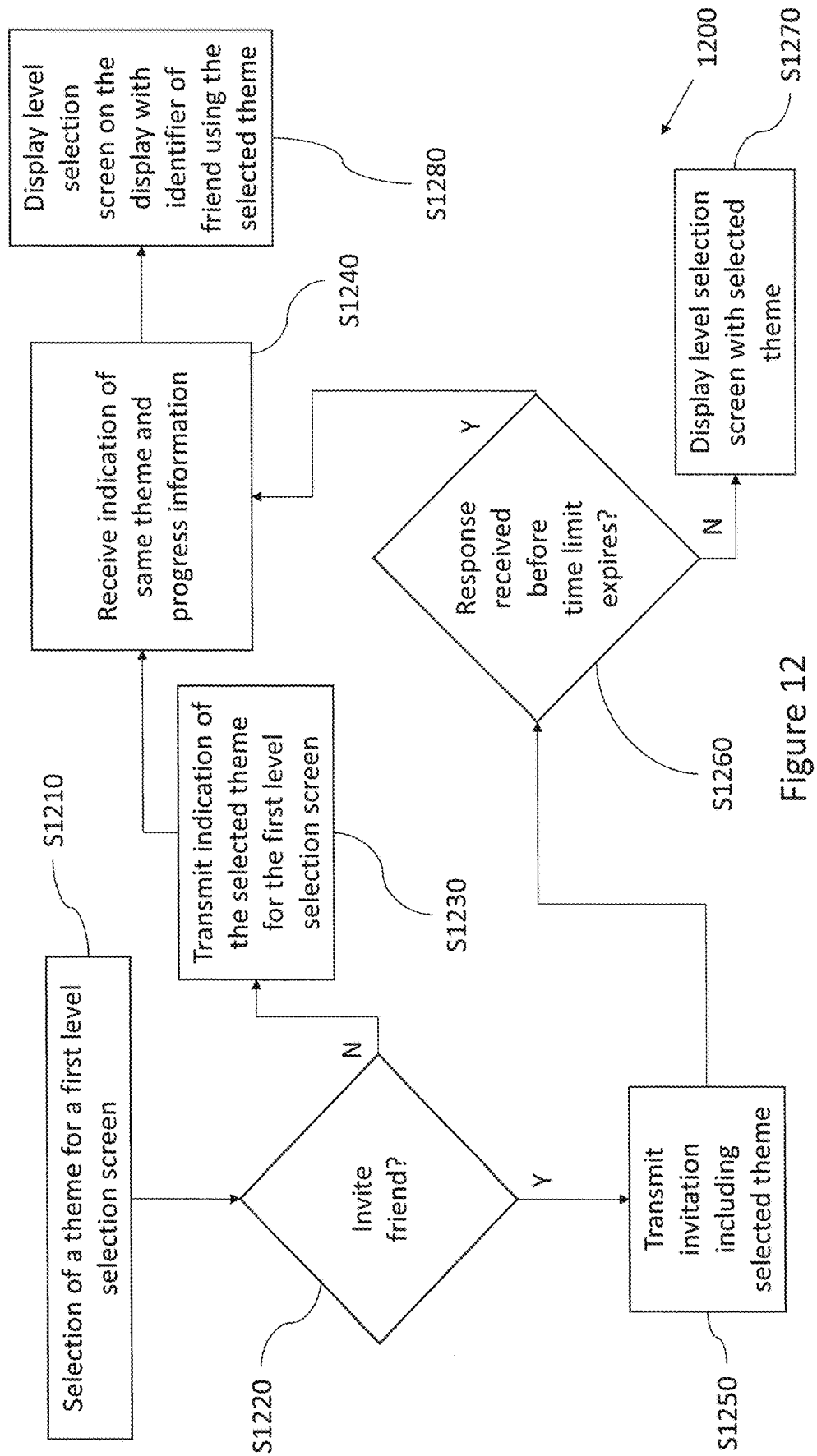
FIG. 12 shows an example method that may be performed in a user device.

Explanations are given of two methods that may be performed in a first user device and a second user device. FIG. 12 describes a method 1200 being performed in a first user device, whilst FIG. 13 describes a method 1300 being performed in a second user device. However, it would be understood by the skilled person that any of the steps of method 1200 may also be performed by the second device, and that any of the steps of method 1300 may be performed in a first device.

Reference is made to FIG. 12, which shows an example of a method 1200, which may be performed at a first device of a first user. The method 1200 may be performed by executing on one or more processors of the first device, computer code. The computer code may be stored on a non-transitory computer readable medium, which may be part of or separate to the first device. It would be appreciated by the skilled person that not all steps of the method are essential, and that in some embodiments one or more steps may be omitted. For example, in some cases, the user devices may operate offline at certain times. In this case, steps S1230 and S1240 could be omitted.

At S1210, the processor of the first device determines that the first user has made a selection of a theme for a first level selection screen to be displayed on the display of the first device.

At S1220, the processor of the first device determines whether or not the first user has selected to invite a friend to use the selected theme. This may comprise determining whether the user has made an appropriate user input on the first device to select to send an invite to a second user.

If the processor determines that the user has not selected to send an invite to use the selected theme, the method proceeds to S1230, where, in response to the user input selecting the theme for the first level selection screen, the processor of the first device controls a network interface of the first device to transmit over a network (e.g. the internet), an indication of the selected theme for the first level selection screen to a server. In response, at S1240, an indication that a second user (who is a friend of the first user) is using the same theme, along with progress information indicating the progress of the second user in a set of levels of the game, is received from a server. The first device may also receive an identifier (e.g. an avatar) of the second user If the processor determines that the first user has selected to send an invite to use the selected theme, the method proceeds to S1250, where the processor of the first device controls a network interface of the first device to transmit over a network (e.g. the internet), an invitation for the second user to use the selected theme for a level selection screen. The invitation comprises an indication of the selected theme for the level selection screen as is transmitted in S1230. The method then proceeds to S1260, where it is determined whether or not a positive indication that the second user has chosen to use the selected theme has been received before the expiry of a time limit for the second user to respond to the invitation. It may be determined whether or not the time limit has expired by using a counter (which may be a counting function implemented by the processor) present in the first device. Alternatively, the remaining time may be calculated by a remote server, which will then transmit an indication that the time limit has expired if it expires. If the time limit has expired without a response that the second user has selected the theme, then the method proceeds to S1270, where the level selection screen is displayed having the selected theme. In this case, the identifier of the second user may or may not be displayed. Preferably, if the second user has the same set of levels on their level selection screen as the first user, the first user device in response to receiving an indication of this is configured to display the identifier of the second user on the level selection screen of the first user regardless of whether or not the second user is using the same theme as the first user. On the other hand, if the second user has a different set of levels on their level selection screen and they have selected to use a different theme for the level selection screen to the first user, preferably the first user device, in response to receiving an indication of this is configured to not display the identifier of the second user on the level selection screen.

If the second user responds to the invitation by selecting to use the same theme as the first user, the first device receives at its network interface this indication and also receives progress information indicating the progress of the second user in a set of levels of the game at S1240. This progress information may be stored in the memory of the device for use in the method at S1280. The progress information of the second user may comprise an indication of the progress of the second user in a second set of levels, different from the first set of levels.

At S1280, the processor of the first controls the display of the first device to display a level selection screen having a first set of levels with the selected theme. The processor may retrieve from memory an identifier and progress information of the first user. The processor is configured to then control the display to shown the identifier of the first user to show their progress in the game. In some cases, the progress information of the second user may have been received at S1270. In this case, the processor may also retrieve from memory an identifier and progress information of the second user. The processor is configured to then control the display to shown the identifier of the second user to show their progress in the game. The relative position of the identifier of the second user in the first set of levels may be the same as the relative position of the identifier of the second user in a second set of levels which are shown on the level selection screen of the second user.

Figure 13:
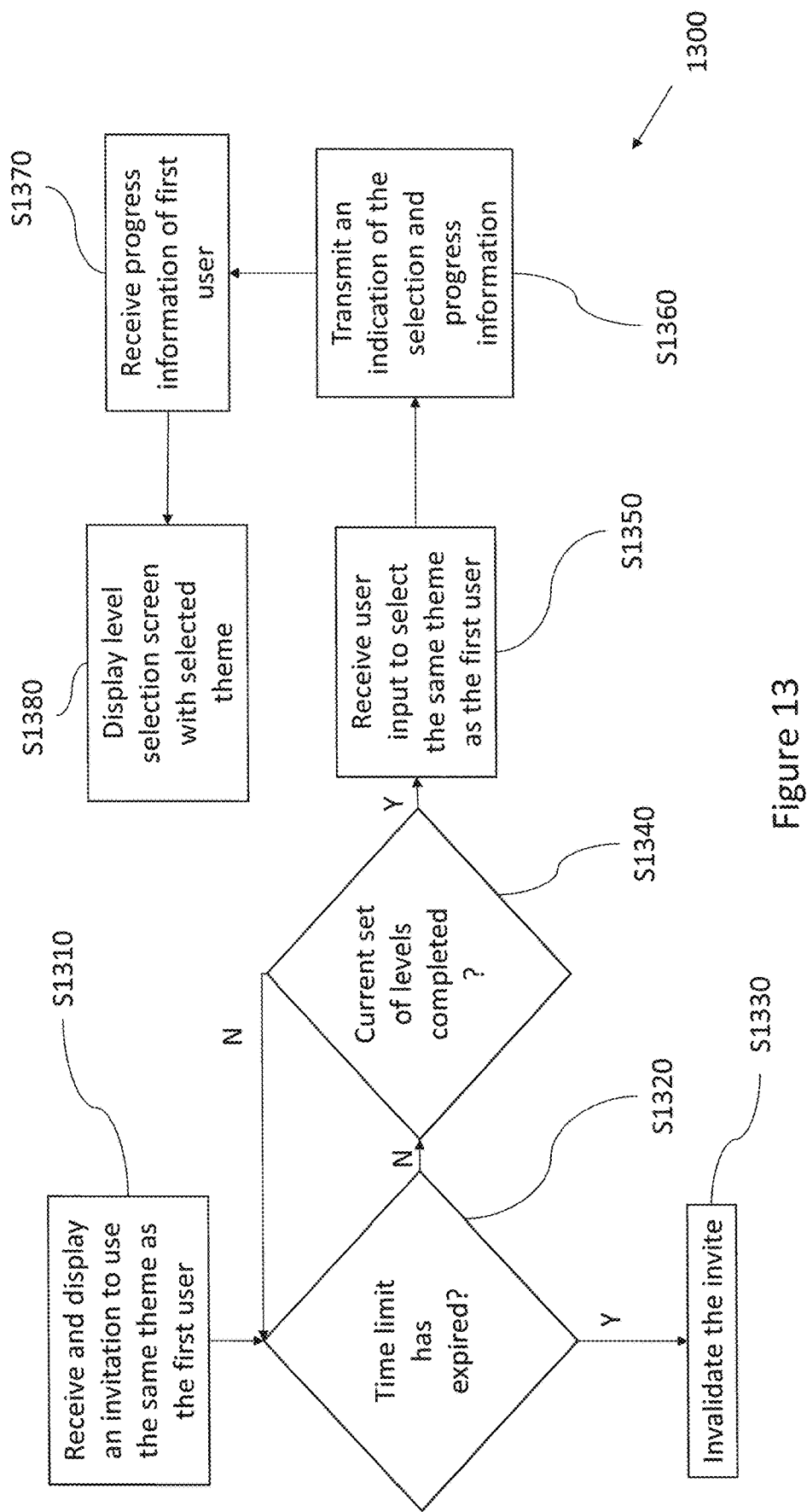
FIG. 13 shows an example method that may be performed in a user device.

Reference is made to FIG. 13, which shows an example of a method 1300 which may be performed at the second device. The method may be performed by executing on one or more processors of the second device, computer code. The computer code may be stored on a non-transitory computer readable medium, which may be part of or separate to the second device. It would be appreciated by the skilled person that not all steps of the method are essential, and that in some embodiments one or more steps may be omitted. In some cases, the user devices may operate offline at certain times. In this case, steps S1360 and S1370 could be omitted.

At S1310, the second device may receive at a network interface an invitation from a first device of the first user to use the same theme for a level selection screen as is used by the first user. The invitation may be received via a server. In response to this invitation, the processor may be configured to control the display of the second device to show the invitation. The invitation allows the second user by making an appropriate user input, to select the theme of the invitation.

At S1320, it is determined whether or not the time limit for positively responding to the invitation by accepting the theme has expired. It may be determined whether or not the time limit has expired by using a counter (which may be a counting function implemented by the processor) present in the second device. Alternatively, the remaining time may be calculated by a remote server, which will then transmit an indication that the time limit has expired if it expires. If the time limit has expired, at S1330, the invite is invalidated. In this case, the themes on the default theme selection screen from which the second user may be permitted to select may be chosen as explained above with reference to FIG. 17. They may be chosen at random with no dependence upon the theme of the invite. A possible theme selection screen 500 is shown in FIG. 5. In some cases, the theme selection screen may permit a choice of theme (e.g. Paris 510) that is the same as the choice of theme, which the second user was invited to use. In other cases, the theme selection screen may provide a choice to the second user of different themes than the theme which the second user was invited to use.

In some examples, if the time limit has not expired, at S1340, the processor determines whether or not the current set of levels has been completed. As explained previously, the second device may require the second user to complete a set of levels prior to accepting the invitation by selecting the same theme for the level selection screen as the first user. If it is determined that the set of levels that are shown on the level selection screen on the second device have not been completed, the method returns to S1320, where it is again determined whether or not the time limit has expired. If it is determined that the set of levels has been completed, the method proceeds to S1350.

At S1350, the processor of the second device detects that user input has been made to select the same theme as the first user as invited.

At S1360, the processor controls the network interface of the second device to transmit an indication that the selection of the same theme has been made. The processor also controls the network interface to transmit progress information of the second user to the first device.

At S1370, progress information of the first user is received at the network interface of the second device and stored in the memory of the second device.

At S1380, the processor controls the display of the second device to display a level selection screen having a second set of levels with the selected theme. The processor may retrieve from memory an identifier and progress information of the second user. The processor is configured to then control the display to shown the identifier of the second user to show their progress in the game. In some cases, the progress information of the first user may have been received at S1370. In this case, the processor may also retrieve from memory an identifier and progress information of the first user. The processor is configured to then control the display to shown the identifier of the first user to show their progress in the game. The relative position of the identifier of the first user in the second set of levels may be the same as the relative position of the identifier of the first user in a first set of levels which are shown on the level selection screen of the first device.

Figure 14:
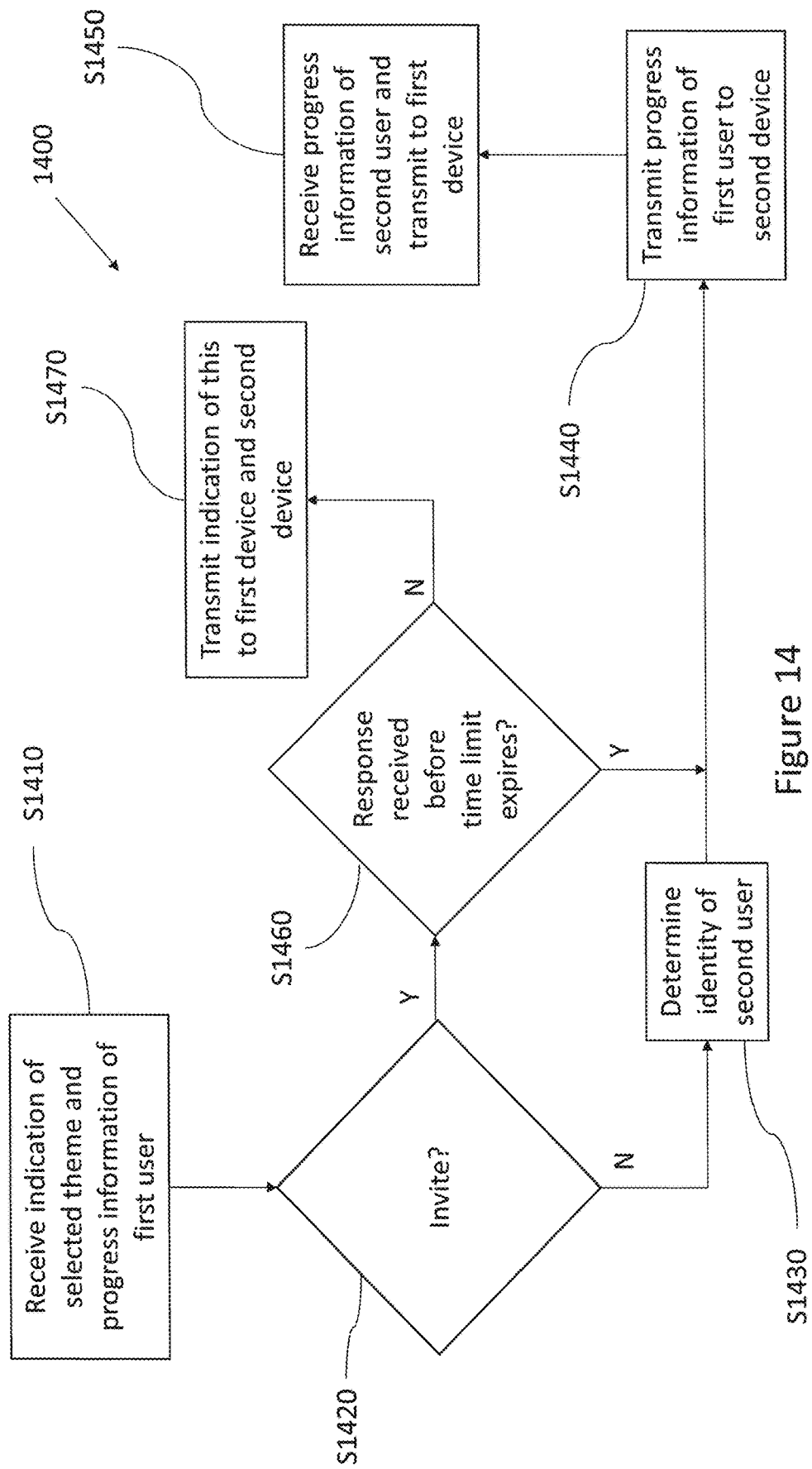
FIG. 14 shows an example method that may be performed in a server.

Reference is made to FIG. 14, which shows an example of a method 1400 which may be performed at a server in communication with the first device and the second device. The method may be performed by executing on one or more processors of the server, computer code. The computer code may be stored on a non-transitory computer readable medium, which may be part of or separate to the server. It would be appreciated by the skilled person that not all steps of the method are essential, and that in some embodiments one or more steps may be omitted.

At S1410, the server is configured to receive at an interface from the first device, an indication of the progress information in the game of the first user and an indication that the first user has selected a particular theme for the display of the level selection screen.

At S1420, if it is determined as to whether or not an invitation for the second user to use the same theme has been received from the first device at the server.

If no invite is received from the first device, at S1430 the server is configured to determine an identity of a second user, who is a friend of the first user who is using the same theme as the first user. The server may search a database comprising user information, such as friends lists for the users of the game to identity one or more friends (including the second user) of the first user who are using the same theme.

The method proceeds to S1440, where the progress information of the first user received at S1410, is transmitted to the second device of the second user identified at S1430.

At S1440, an indication of the theme selected by the first user is also transmitted to the second device.

At S1450, the server receives progress information of the second user from the second device, and transmits this progress information to the first device along with the indication of the theme selected by the second device. Thereby, both the first and second device engage in an exchange of respective user progress information and may use this information to control the position of identifiers of the first user and the second user on the first and second set of levels shown on the level selection screens on the first and second devices, respectively.

If it is determined at S1420 that an invite is received from the first device, the method proceeds to S1460, where it is determined whether or not a positive indication that the second user has chosen to use the selected theme has been received before the expiry of a time limit for the second user to respond to the invitation. It may be determined whether or not the time limit has expired by using a counter (which may be a counting function implemented by the processor) present in the server. If the time limit expires prior to such an indication being received, the method proceeds to S1470, where the server transmits an indication that the time limit has expired prior to the invitation being accepted to the first and second devices. If the server receives an indication that the invitation is accepted from the second device prior to the expiry of the time limit, the method proceeds to S1440.

The level map, or Saga Map, may have a particular theme. The theme may be chosen by a user as described above. The theme may define one or more of the particular graphics, colours, animations, and layouts that are used for the Saga Map. There may be, for example, two different themes for the user to choose from, New York and Barcelona, which may each have a different arrangement of the nodes representing the levels along the level map, or each theme may have different shaped nodes. Themes may also be referred to as locations.

The Saga Map may be divided into a plurality of episodes. Each episode may comprise a set of levels within a theme.

Details of a mode referred to herein as the 'Episode Race' will now be described. According to such an episode race, a player who is progressing through levels in an episode can compete in time with one or more other players. This could be in the context of another player who is playing a different set of levels in the same episode, as described earlier, or in the context of playing against another player who has already played the same levels in the same episode. According to the first arrangement, that is when one player is playing against another player in a 'live' scenario, player data updating the progress of each player can be exchanged between their respective devices at any suitable time. If the computer devices are both online, player data may be updated when each player completes a level within their set. If one of the players goes off-line, their device can be updated with player data accessed from the server when they come back online. A race can be created when a player enters a location, referred to above as a 'theme'.

In some embodiments, an episode race may only be offered when a player enters the theme and certain conditions are satisfied. For example, if a user starts an episode while off-line and does not progress further than a predetermined percentage of that episode (for example 50%), when he goes online he is offered an episode race within that episode and is eligible for that race. If the user has already progressed past a certain percentage of the episode (e.g. 50%) then no race is offered for that particular episode. This means that episode races are offered in circumstances where it is likely to increase the level of fun of a player, and thus enhance their engagement. In the context of live players, logic may be provided to match players with one another such that they can take part in an episode race against each other. In this case, even if one player has not progressed further than a predetermined percentage of an episode (and would therefore in principle qualify for an episode race), he may only be matched with other players satisfying similar criteria. It is possible therefore that at any particular time there may be no available second player who has not yet completed the predetermined percentage of levels in the episode for matching with him. Logic may be provided to ensure that matches are made in such a way that players competing in an episode race are likely to experience an enjoyable competitive element. This means that they should not be too far apart, at least at the beginning of the race.

An arrangement wherein a player is playing against 'live' opponents, such that his opponents are other users playing the game in real time, rather than playing against 'bots' comprising historic user data, will now be described.

The embodiment of playing against 'live' opponents may be implemented in the infrastructure describes with reference to FIGS. 3 and 4.

Figure 22:
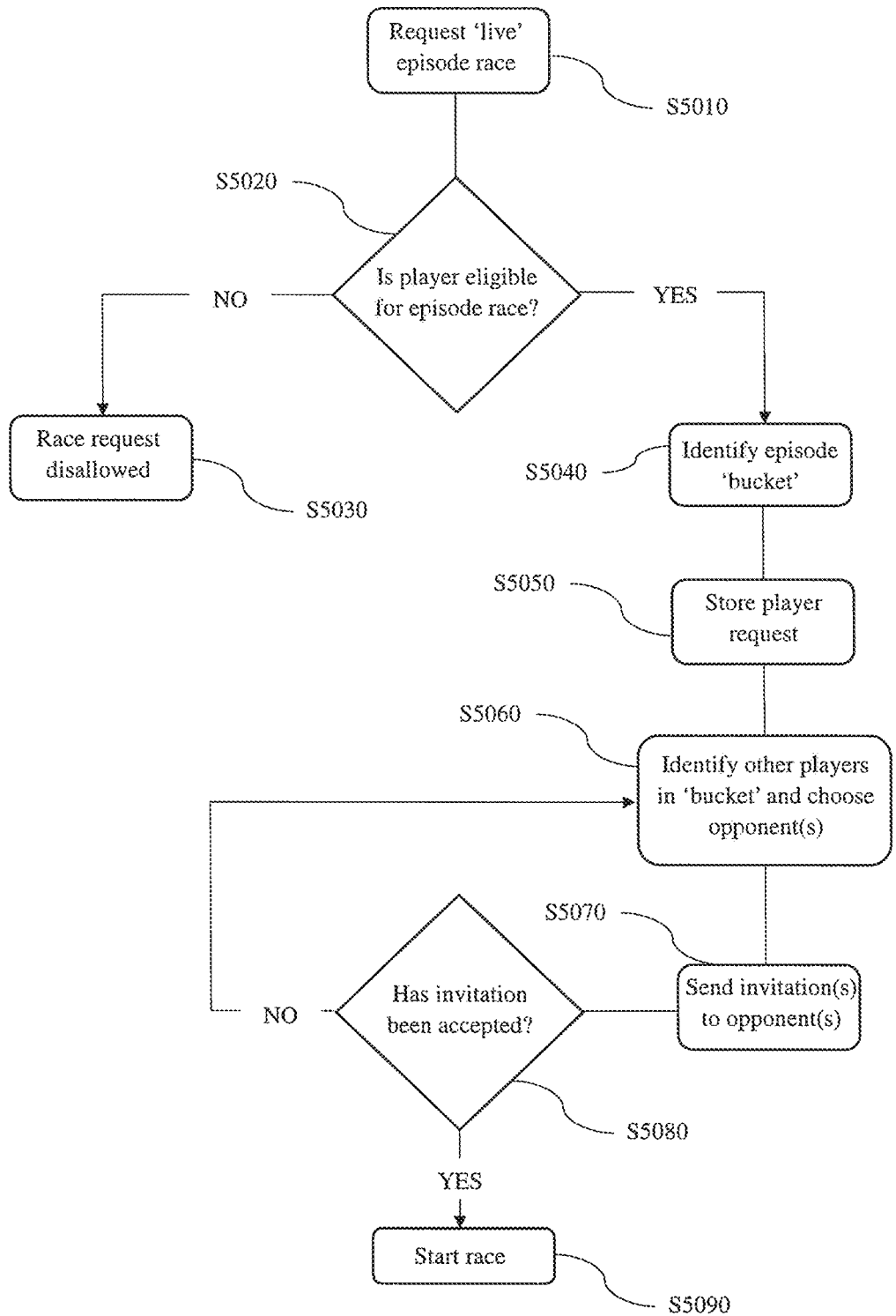
FIG. 22 shows an exemplary sequence for the initiation of a 'live' episode race.

FIG. 22 shows an exemplary sequence for the initiation of a 'live' episode race. In step S5010 the user requests a 'live' episode race. In some embodiments, this may be an option presented to the player on the Saga Map, for example, in the options menu. In other embodiments, it may be presented to the player on the screen of user device 304 when he starts a new session. The player must be online to make a 'live' episode race request. The user may provide a user input to engage with the screen in order to request an episode race, or to accept an invitation. The request is then sent to the game server 300 as an electronic message transmitted over the network.

At step S5020, the eligibility of the player for an episode race is assessed. This assessment could be carried out at the user device prior to issuing a request, or at the server. The criterion for staring a race may be that the player's progress within the episode is below a pre-determined threshold. For example, there may be a threshold set at level 3, such that, if the player has progressed beyond level 3 of the episode, he is no longer eligible to play the episode race. In some embodiments, the criterion to commence an episode race may vary between different episodes, or between different episode races.

If the player is not eligible for the episode race, i.e. he does not fulfil the criterion for the race, the process proceeds to step S5030, where the request is disallowed. The user may continue to play the episode outside of a race.

If, however, the player does meet the race criterion, the episode 'bucket', or group of episodes, in which the player falls is identified in step S5040. Players may be matched with other players whose position falls within the same episode 'bucket' for the episode race. There may, for example, be 3 episodes in each 'bucket'.

In step S5050, the player's episode race request is stored in a store provided by electronic memory at the game server 300. The request may be stored in association with the player's username, or some other unique player identifier. Data about the level the player has reached and the episode he is in may be stored. The episode 'bucket' the player falls within may also be stored. The data may be timestamped. Requests may be stored in association with other requests from players in the same episode 'bucket'.

Once the request has been stored, other players who have also made 'live' episode race requests who are in the same episode 'bucket' may be identified, step S5060. Possible opponents may be users that the requesting player know, for example a Facebook friend, or they may be unknown to the player. The opponents may be presented to the player anonymously, or the player may be able to see their usernames on the display of their user device.

Opponents must still fulfil the necessary criterion to start an episode race. In some embodiments, the criterion may be checked once the user has been selected to be an opponent. In other embodiments, the request data stored for each player may be updated each time the player progresses to a new level. In this embodiment, the request data may be deleted once the player has progressed past the level at which he is eligible for an episode race.

Opponents are chosen from the players identified in the episode 'bucket'. The number of opponents selected may vary depending on the episode or the episode race. In some embodiments, the requesting player may be able to choose the number of opponents he plays against. In some embodiment, more opponents than the number of allowable opponents may be selected such that, if the first number of allowable opponents do not respond within a set timeframe, the next chosen opponent receives a request.

Invitations are sent to opponents in step S5070 by the server as electronic messages via the network. Invitations are addressed to users at their user devices. An opponent does not have to be online for an invitation to be sent. An opponent who is offline may receive a push notification that an invitation has been sent to him. The notification may be visible or not—it may be acted on by the user device when it comes back online. An invitation may have a time period associated with it, such that it expires after a set amount of time.

At step S5080, the system determines if the invitation has been accepted by the opponent. If the invitation has not been accepted, the player can continue to play the episode outside of an episode race. The opponent can respond to the initiation at any time, or until the end of the time period associated with the invitation. If the player has continued to play after the invitation was sent but before the invitation was accepted, the player must still meet the episode race criterion when the invitation is accepted.

If the invitation has not been accepted after a pre-determined period of time, the process returns to step S5060, and another opponent is chosen from the episode 'bucket'.

If, however, the invitation is accepted at step S5080, the race begins in step S5090.

It will be appreciated by a person skilled in the art that the steps of the above method may be performed in a different order, or some steps may be omitted. For example, step S5020 may occur before step S5010, such that only players eligible for the episode race are presented with the option of requesting the episode race.

In some embodiments, step S5010, where the player requests a 'live' episode race, may be replaced by, for example, the player being offered a 'live' episode race. For example, if an episode race has been scheduled to take place, so the campaign is either about to open or there is a current race running, an invitation to join may be presented to the player when he goes online, if he satisfies any pre-determined criteria for the episode race. The player's opponents may have already been selected when he is offered the race, or they may be selected once he has accepted the invitation. If fewer than the required number of participants accept the episode race, more opponents may be invited to join. In the same way, when playing against bots the player may be presented with an invitation to join the race when he goes online, and the bots may have already been created.

In other embodiments, the request for a live episode race may be performed by the user device 304 rather than the player. For example, the user device 304 may have received a message from the game server 300 that an episode race is available. When the player goes online, the user device 304 assesses if the player meets any criteria for participating in the race, and sends a request message to the game server 300 for the player to join the race if he does.

In some embodiments, players may not start the episode race on the same level. Players may, for example, start at the level they are on. Episode races may be pre-defined to specify a number of levels the opponents must complete. In other embodiments, which levels the players must complete is defined. Players may be able to race over different episodes, but within the same episode 'bucket', and they race relative to each other. For example, an episode race may be defined such that 8 levels must be completed. Player 1 may start on level 2 of episode 1, and finish at level 9, whereas player 2 starts at level 1 of episode 3, and finishes on level 8. In other embodiments, the race may be over all of the levels of the episode. The players may start at the first level of the episode when the race starts, or they may start from the level they have reached within the episode. Parameters may be set when the event or campaign is scheduled. For example, this 8 level race may be scheduled to be available for 2 months, and players must have completed fewer than 3 levels of their episode to be eligible. Episode 'buckets' may also be determined when a race is scheduled.

Figure 19:
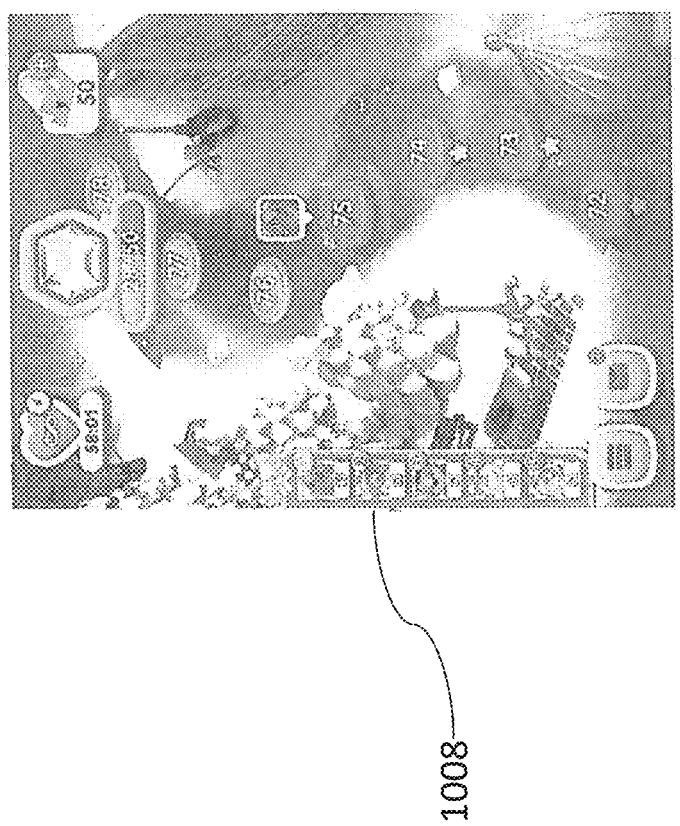
FIG. 19 shows an example saga map during an episode race.

The relative positions of the players may be represented in a number of ways. The players may be shown in their relative positions in a vertical array 1008, as seen in FIG. 19. In other embodiments, the players are shown in their relative positions on the Saga Map. In some embodiments, the avatars of the opponents may be smaller than that of the player, as in FIG. 6. In other embodiments, the avatars of the opponents may be 'ghosted', as shown in FIG. 8. In other embodiments, the coloured borders around the avatars are different colours.

Once the race commences, race data may be updated every time the player returns to the Saga Map. This may be every time a level is completed by the player. In other embodiments, race data is updated periodically. When the player returns to the Saga Map, the relative positions of the players are updated. Race data may also be updated when the opponents of the player finish a level, such that the relative positions of the players are updated every time any of the players finishes a level.

Players may play the episode race offline. The relative positions of the players may be based on the last received data about the opponents, and the current data of the player, such that the absolute position of the opponents do not change while the player is offline.

When the player returns to playing online, the race data about the opponents is updated. The opponents receive an update about the progress of the player. Once the data has been updated, the data held about all of the players is compared, and the relative positions are updated. This may be shown as an animation on the user display.

Once the episode race has been completed, the final positions of the players relative to each other is determined. Players who finish in the top pre-determined number of players receive a reward. This corresponds to steps S3034-S3040 in FIG. 20, in which players finishing in the top 3 places receive a reward.

It is possible to play an episode race against 'players' who are historic or virtual. An arrangement involving such players will now be described.

A race instance could consist of, for example, a player and four 'bots'. A 'bot' is a virtual player that represents data that has been provided from historical players of the levels. Each bot can represent a progression rate of a historical player. For example, the progression rates may be different, and could be very slow, slow, medium or fast. The use of these bots in the visual indication of the player's progression is discussed later. A bot could represent an actual 'historic' player, or could be defined as an aggregation of historic player data as described later.

Figure 18:
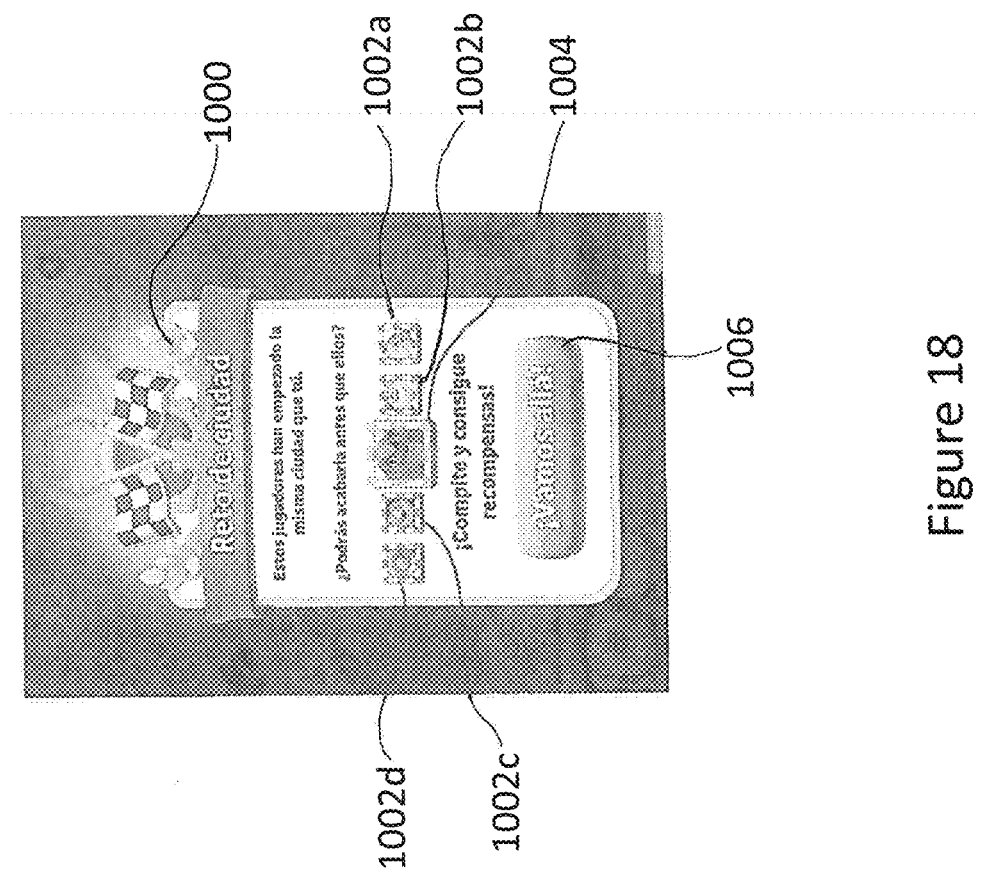
FIG. 18 shows an example announcement screen for an episode race.

FIG. 18 shows an announcement screen for an episode race when it is offered to a player. The announcement screen has a notice 1000 (e.g. a start flag) that the race is provided and visual indicators (avatars) 1002*a* to *d* representing bots.

Reference numeral 1004 denotes a location awaiting an avatar representing the player. The player indicates his desire to start the episode race by pressing a race start button 1006 labelled 'Vamos Allá' in FIG. 18. Once pressed, the player avatar is shown.

After the race starts, there is an animated transition displayed to the player in which the announcement screen fades away, and the avatars 1002*a* to 1002*d* and the first player indicator (avatar) flow to the right (left as viewed) of the saga map screen in a vertical array 1008. This is shown more clearly in FIG. 19. When all levels of the episode have been completed, the race is finished and an end flag animation is included at the final level. The screen will zoom back to the first level and the start flag 1000 will be displayed again. The avatars which act as the player representations are provided onto the display through a widget which contains the following information and visual indicators. The widget displays the avatars 1002*a* to 1002*d* each with a racing frame, and the player representation with a 'this is you' indication. For example, the indication may be a boarder of a different colour around the first player indicator to the colour of those around the avatars 1002*a* to 1002*d*. The widget shows the current position of the current player relative to the level position of the other players. FIG. 19 shows the screen during a race. As a player who is engaged in the race moves through the levels, his completion time for each level from starting the episode is recorded and compared with the completion time indicated by the 'bots' at their respective progression levels. This comparison is used to determine where visual representation of the player and bots should be shown in the vertical array 1008 on the screen in FIG. 19, relative to the other avatars. For example, if the player has gained a certain level within a time faster than any of the player data defining the bots, then the player's avatar will be shown at the top of the vertical array. However, if the player completes a level in a slower time, his position will be shown at a lower position in the array, in fact, in the correct relative position based on his time and the times associated with the 'bots'. The use of player data to generate bots is discussed later.

When a player finishes the episode (has completed all levels) one of two different screens will appear based on the race results. A 'win' screen indicates to the player that they have won (that they are in position 1) and provides them with a button to continue play. A 'lose' screen displays advisory information and offers the opportunity for a player to keep trying.

Each bot could be based on a particular historical player, but in the interests of anonymisation could instead be based on aggregated player data of players completing the levels within certain time periods (fast, medium, slowly, very slowly et cetera). An algorithm within the game logic can determine the progression level of the bots which are presented to a particular user for their race. This could be based on previous information about that player's 'standard', or be on a randomised basis. The aim of the algorithm is to make the challenge for a player more fun and engaging, and is described later.

The progression of a player is determined based on the time that the player has taken to complete each level. That is, the time is noted of the player from the beginning of when a player started to play the episode to when they had completed a particular level. It is this completion time of a level which is used to compare the player with the 'bots' against which he is 'racing'.

Figure 20:
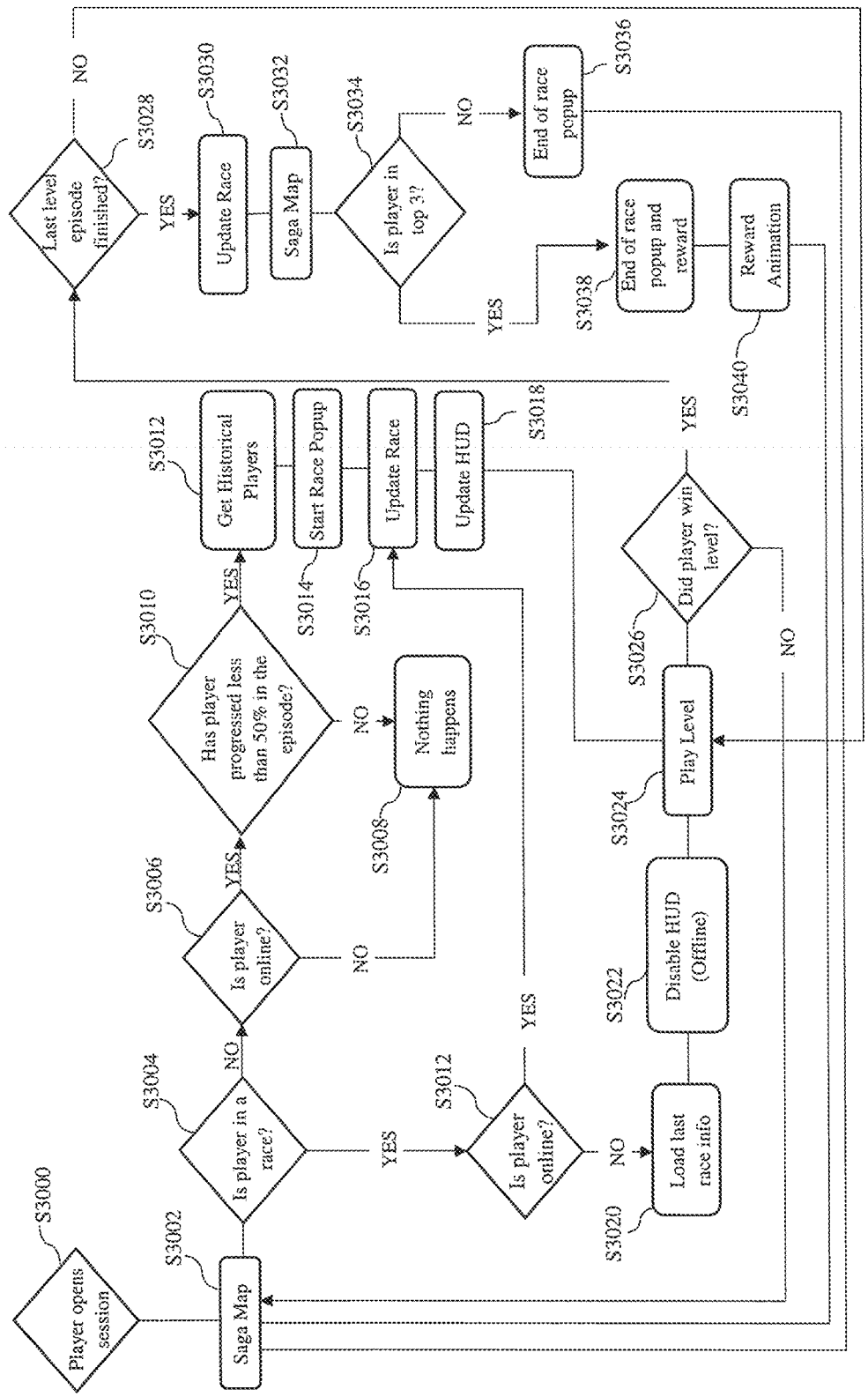
FIG. 20 shows an example flow of the episode race logic.

FIG. 20 is a flowchart illustrating an exemplary flow of the episode race logic for a race in which the player is competing against bots. At step S3000 the player opens a game session. He is presented with the saga map at step S3002. At step S3004 the episode race logic determines whether or not the player is already in a race. If he is not, a check is done at step S3006 as to whether or not the player is engaging with his device in an off-line or online mode. If the player is off-line, nothing happens in relation to an episode race as indicated by step S3008. However, if the player is online a check is made at step S3010 as to whether or not he has satisfied the condition to be offered an episode race. For example, in the illustrated flowchart, the condition may be that the player has completed less than 50% of the game levels available in that episode. If he does not satisfy the condition, that is if he has completed more than 50% of the levels, then the flow proceeds to step S3008 and nothing happens in relation to an episode race. However, if the player satisfies the condition, the logic proceeds to access an episode race. At step S3012 data from historical players is accessed, for example from a data store which stores data from historical players. The data store may be associated with a processing function which aggregates and organises data from historical players such that it can provide the set of predetermined 'bots', each one representing a certain level of progression (or speed of progression). At step S3014 the race pop-ups are started, as explained above. At step S3016 the race is updated as the player progresses. This is an update of both the player data and the data of the progression of the bots against which the player is playing. At step S3018 the widget showing the avatars representing the relative progression of the bots to the current player is updated. Note that this widget could be updated locally at the device, based on player data from the player and the bots, or in an alternative embodiment could be updated at the server and transmitted to the device. In the first arrangement where there are two 'live' players, the widget could be updated based on live player data received at the device. At step S3024 the player plays the next level in the episode, and his completion time from starting the episode is recorded to later be compared against those of the bots.

Reverting back to step S3004, if the player is already in a race, a check is made at step S3012 to whether the player is online or off-line. If the player is online, flow proceeds to step S3016 and the race data of both that player and his opponents is updated, followed by an update of the displayed avatars showing the relative progression of the player and the bots. If the player is off-line, the last race information is loaded at step S3020, and the avatar widget is disabled at step S3022. The flow then proceeds to enable the player to play the level at step S3024.

At step S3026 there is a check as to whether or not the player has won the level. If so, a further check is made at step S3028 to assess whether that was the last level in the episode. If it is, the race is updated at step S3030. The saga map is then offered again at step S3032 and a check is made at step S3034 as to whether or not the player finished in the top 3. If he did not, an end of race pop-up as described above is shown at step S3036. The flow then returns to the saga map at step S3002. If the player was in the top 3, the flow proceeds to a different end of race pop-up at step S3038 which indicates that a reward is available, and this may be followed by a reward animation at step S3040. After that the flow then returns to the saga map at S3002.

It will be appreciated by a person skilled in the art that the steps of FIG. 20 may be implemented in an alternative order, with additional step added or with steps removed.

The timing of the race updates in races against bots while the player is offline may depend on how the pre-determined bot data is stored. Data about the progression of the bots is known before the start of the episode race, and is determined using historical player data as described later. The bot data may be stored locally on user device 304 or remotely on the game server 300.

Time is tracked from the commencement of the race. This tracked time can then be used to determine the position of the bots. The position of each bot at any time is pre-determined when the bot is created so the position of a bot at a certain time, for example at the time when the player returns to the saga map after completing a level, can be found by checking the bot data at the tracked time.

If the bot data is stored on the gamer server 300, the progression of the bots will not be updated while the player is offline. The player's progression will be recorded relative to the last updated bot data. When the player goes back online, the position of the bots is updated and the relative positions of the player and the bots is re-evaluated.

However, if the bot data is stored locally on user device 304, the bot data may be updated every time the player returns to the saga map, so at the same time that the player data is updated. Alternatively, the position of the bot may be updated every time a bot finishes a level, as determined by the pre-determined bot data. The two methods of updating opponent data are the same as if the player were playing online against other bots or live opponents, or a combination of the two.

It will be appreciated that the flowchart of FIG. 20 may be implemented in a modified way if the player is competing in a 'live' episode race. For example, the step of accessing historical player data, S3012, may be replaced by retrieving 'live' opponents form the episode 'bucket', as described in FIG. 22.

Figure 21:
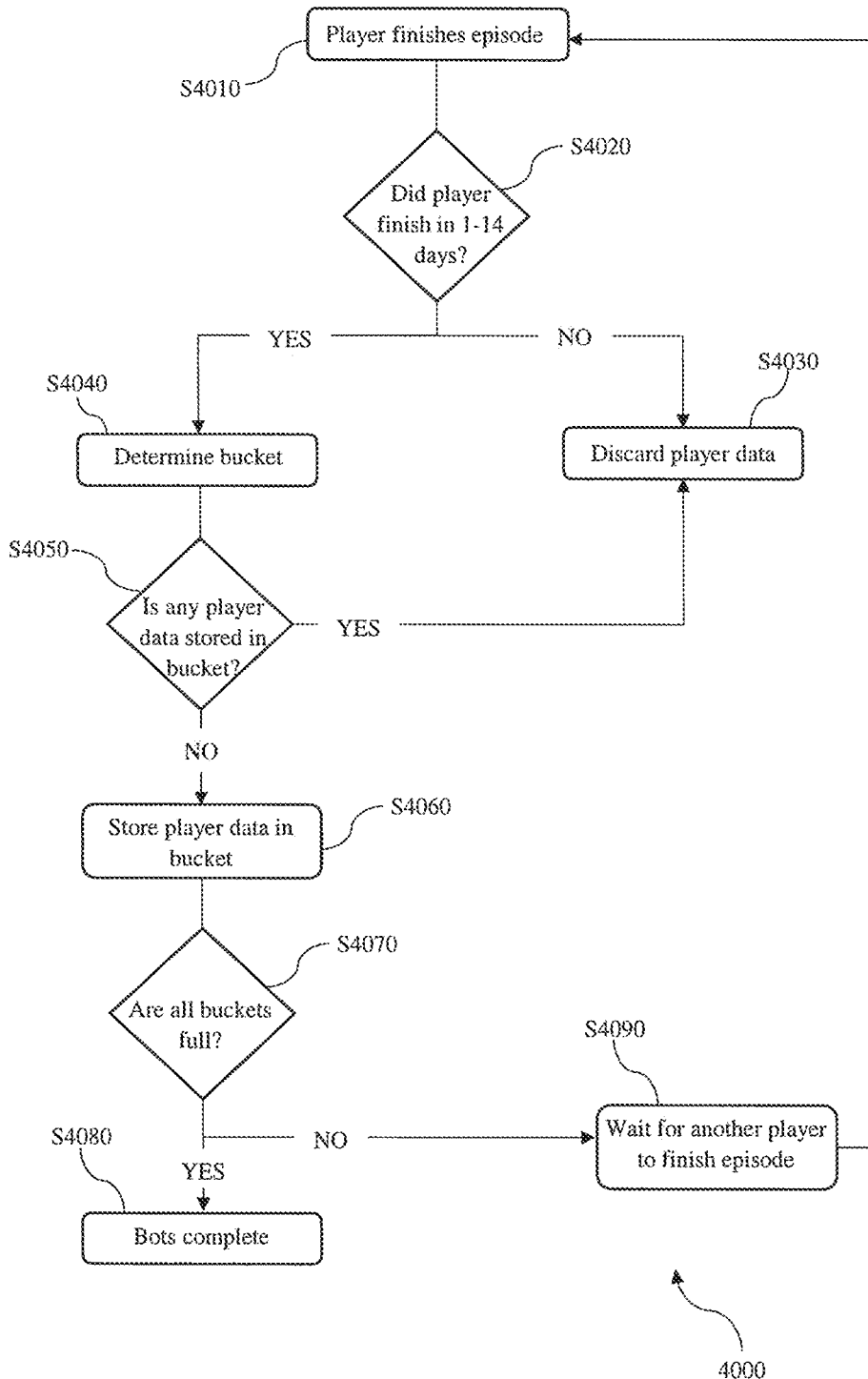
FIG. 21 shows an example method of automatically creating bots.

FIG. 21 describes a method 4000 for automatically creating race templates, or 'bots'. This method may be performed at a server which is in communication with one or more user devices.

At step S4010, a player using a user device in communication with the server finishes the episode he is playing. Player data about the completed episode is sent to the server. This may include the levels within the episode, the time taken for the player to complete each level, and the total time taken for the player to complete the whole episode.

At step S4020, it is determined if the player completed the episode within a pre-determined time period from starting the episode, for example 1-14 days as shown. If he did not, the player data is discarded at step S4030. However, if the player has completed the episode within the time period (1-14 days), the 'bucket' which the player data belongs in is determined at step S4040 based on the total time taken. 'Buckets' are described below.

There may be, for example, four bots corresponding to four different progression rates for a player to compete against in an episode race. These progression rates may be 'very slow', 'slow', 'medium', and 'fast'. Each progression rate may be associated with a different bucket which determines how the bot proceeds in the episode. Buckets contain player data for the episode, where the player data stored in each bucket is dependent on the total time taken for the player to complete the episode. For example, the buckets may be divided into time periods of 1-4.25 days (fast), 4.25-7.5 days (medium), 7.5-10.75 days (slow), and 10.75-14 days (very slow).

Once the bucket has been determined at step S4040, the server is configured to check if any player data is already stored in the bucket at step S4050. If there is already player data stored in the bucket then the player data is discarded at step S4030. This would be the case if, for example, a first player, who's device is in communication with the server, completed the episode in 8.5 days, so falling in the 'slow' bucket time period, but a second player, who's devices is also in communication with the server, had completed the episode in 9.75 days, so also falling within the 'slow' bucket time period, before the first player completed the episode, and the second player's data was stored in the 'slow' bucket when he completed the episode. Here, the second player's data would remain stored in the 'slow' bucket, and the first player's data would be discarded.

If, however, at step S4050 it is found that the bucket is empty, such that no players have finished the episode within the same bucket time period, the player data is stored in the bucket at step S4060. The server is then configured to run a check, at step S4070, to see if all of the buckets contain player data.

If one or more of the buckets does not contain player data, the server waits for another player to complete the episode at step S4090, before returning to step S4010 to repeat the process.

If all of the buckets contain player data, each of the four bots has player data associated with it so the bots for that episode are complete, step S4080, and a player can compete in an episode race against those bots as described above.

In some embodiments, player data from more than one player may be stored in each bucket. For example, a bucket may only be 'full' when 5 sets of player data are stored in the bucket, such that 5 players have completed the episode within the time period of the bucket. It would be appreciated by a person skilled in the art that these sets of player data may be from one player playing the episode five times, from five different players playing the episode once, or a combination thereof. The player data in each bucket may be averaged, or combined by some other method to form the bot data against with a player in an episode race competes.

In other embodiments, all player data is stored in the relevant bucket, such that the bucket contains player data associated with all players who have completed the episode within the bucket time period, and the bot data is updated as each new set of player data is stored.

In some embodiments, the player data stored in each bucket may be deleted after a pre-determined period of time. For example, player data may be stored in the bucket for five days. In this embodiment, player data may be stored with a timestamp, such that, when a counter (which may be a counter function implemented by a processor at the server) reaches a time five days after the time of the timestamp, the player data is deleted from the bucket. In another embodiment all player data is deleted from a bucket at a pre-determined time. This may be set so that the data is deleted every, for example, 10 days, or every time the game is updated.

The method 4000 may be performed by executing, on one or more processors of the server, computer code. The computer code may be stored on a non-transitory computer readable medium, which may be part of or separate to the server.

Figure 15:
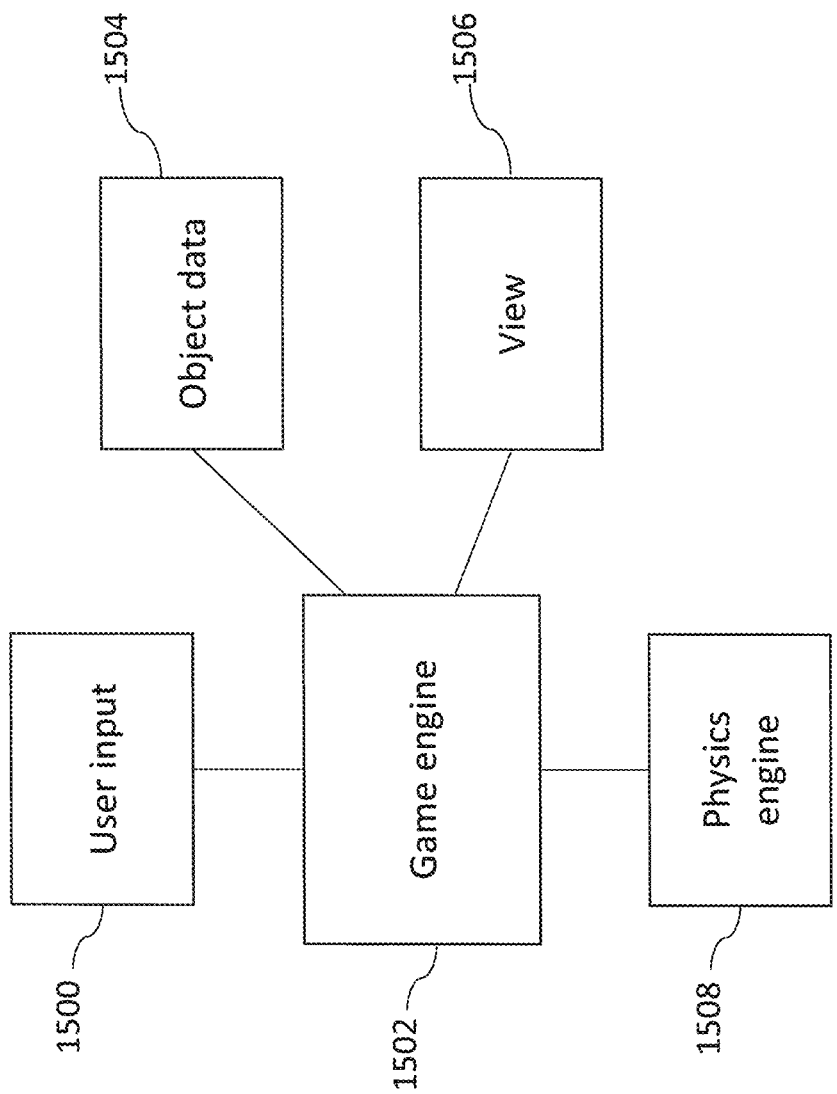
FIG. 15 is a schematic diagram showing the modules and functions associated with carrying out the embodiments.

Reference is made to FIG. 15 which schematically shows the functional blocks of an embodiment, which may enable game play such as discussed previously. A user input block 1500 is shown. This captures the user input and feeds the input to a game engine 1502. In the context of the game of some embodiments, this user input may be which game objects which are selected by a user. This user input can be via any suitable user interface, such as discussed earlier.

The game engine 1502 will process the information provided by the user input. The game engine 1502 (for example a game model) will determine if a valid selection has been made.

Each game element has object data associated therewith. The object data 1504 may be stored in any suitable memory location. In some embodiments, the object data 1504 may be provided by the data structure described later. In some embodiments, the object data 1504 may be considered to be part of the game engine 1502, and in other embodiments may be considered to be outside the game engine 1502. The object data 1504 may provide information as to the properties of a game element. These properties can include attribute information such as colour and/or whether or not a game element has a particular function, such as a so-called booster function. The object data 1504 may include the position data, that is, information representing the position of the game element in the displayed image.

In some embodiments, the game engine 1502 will check if the game element satisfies the rule or rules for a valid set selection. The rule or rules may define whether or not a set exist been satisfied. The conditions will be dependent on the game.

Thus, the game engine 1502 will be in control of the rules for determining if a valid set is selected. The game engine 1502 will have access to data for each tile including its position and the at least one characteristic associated with the tile, and will be able to determine if a valid set condition has been met. If a valid set condition is met, the tiles in the set may be removed.

It should be appreciated that in other embodiments, the game may use any type of mechanic such as switching, sliding or linking. The game elements may be any suitable game elements and in some embodiments may be letters.

A physics engine 1508 is provided which is configured to control the movement of moving game elements on the display. The physics engine 1508 may be part of the game engine 1502. A view function 1506 uses of the object data to provide the displayed image which the user is able to view and/or interact with.

It will be appreciated that whilst the above has referred to the game Candy Crush Saga™, embodiments are not limited to that particular game, and may support other games that use a similar or different game mechanics.

The terms user and player are used interchangeably throughout this document and no specific meaning is intended using one or the other unless the context suggests otherwise.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the game in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of controlling a graphical user interface of a computer device, the method comprising:
    displaying on the graphical user interface a first set of levels of a plurality of levels of a game, the game being executed by a processor of the computer device, the plurality of levels arranged in episodes, each episode comprising a set of levels, the levels of each episode playable in a predetermined sequence wherein access to a next level is granted on completion of the preceding levels, and wherein the first set of levels are associated with a first episode,
    wherein each level is associated with a gameboard of multiple game elements rendered on the graphical user interface and having a game objective to be achieved in order to complete the level,
    at each level of the first set of levels of the first episode, receiving player inputs from a first player engaging with that level, to enable the game to determine when that level has been completed by the first player and to generate first player data indicating the level of the first set of levels that the first player is engaged with, wherein the player inputs are detected to determine the selection of one or more game elements by the player to create a match of at least three adjacent game elements of the same type, to remove the matching game elements from the game board and to repopulate the gameboard with replacement game elements; and
    displaying on the graphical user interface a visual representation of relative positions of the first player and of a second player in the first set of levels based on a first completion time of one or more level by the first player in the first set of levels indicated by the first player data relative to a second completion time of one or more of a second set of levels of the first episode, the second completion time indicated by second player data associated with the second set of levels which determines the second player position.

2. The method according to claim 1 comprising determining based on the first and second player data which of the first and second set of levels was completed first in an episode race in the first episode.

3. The method according to claim 1 comprising generating a visual indicator of a second player at the second player position determined by the second player data relative to a visual indicator of the first player.

4. The method according to claim 1 wherein the second player data is of a second player engaged in an instance of the game at a second computer device at which the second set of levels of the first episode is displayed, wherein the first and second players are competing against each other in an episode race in the first episode.

5. The method according to claim 4 wherein the second player data is live data of the second player.

6. The method according to claim 1 wherein the second player data is pre-stored data for access by the computer device for determining the second player position relative to the first player position.

7. The method according to claim 6 wherein the second player data was derived from at least one live second player who played the second set of levels at an earlier time.

8. The method according to claim 6 wherein the second player data is derived algorithmically from player data from multiple players who played the second set of levels at earlier times.

9. The method according to claim 6 wherein the second player data is stored at a server for access by the computer device when the computer device is connected to the server to play the game in an online mode.

10. The method according to claim 1 comprising displaying on the graphical user interface the relative first and second player positions and at least one further player position indicated by further player data, whereby the relative position of multiple players is visually indicated.

11. The method according to claim 1 comprising displaying on the graphical user interface a visual indication that an episode race in the first episode is available to the first player.

12. The method according to claim 11 comprising the step of determining that the episode race is available to provide said visual indication if less than a certain proportion of the levels have been completed by the first player in that episode.

13. The method according to claim 12 wherein the determining step is carried out at a server when the computer device is connected to the server for the first player to play the game in an online mode.

14. The method according to claim 1 wherein the visual representation comprises an arrangement of visual indicators representing respectively first and second player data arranged linearly on the graphical user interface in an order matching the order of relative completion times in an episode race in the first episode.

15. The method according to claim 1 wherein displaying the visual representation of the relative first and second player positions comprises indicating the first player position as a non-ghosted visual indicator, and indicating the second player position on the graphical user interface as a ghosted visual indicator located at a level in the first set of levels.

16. The method according to claim 1 wherein the first and second set of levels are the same.

17. The method according to claim 1 wherein the first and second sets of levels are different.

18. The method according to claim 2 wherein the episode race requires all levels of the set of levels in the first episode to be completed.

19. The method according to claim 11 comprising indicating that the episode race requires a certain number of levels of the set of levels in the first episode to be completed.

20. The method according to claim 11 comprising indicating that the episode race requires particular levels of the set of levels in the first episode to be completed.

21. The method according to claim 2 comprising, when the episode race has been completed, providing a reward to one of the first and second players who first completed their set of levels.

22. The method according to claim 10 comprising determining final relative positions of the first, second and at least one further player following completion of an episode race in the first episode, and providing a reward to each of a predetermined number of the players in a corresponding predetermined number of top positions.

23. The method according to claim 1 wherein the visual representations of relative positions of the first and second players are provided on the graphical user interface by a widget.

24. The method according to claim 1 comprising updating the visual representations of the relative positions of the first and second players each time at least one of the first and second players completes a level of the set of levels.

25. A computer device comprising:
a graphical user interface;
a processor configured to execute a game and to display on the graphical user interface a first set of levels of a plurality of levels of a game, the plurality of levels arranged in episodes, each episode comprising a set of levels, the levels of each episode playable in a predetermined sequence wherein access to a next level is granted on completion of the preceding level and wherein the first set of levels are associated with a first episode, wherein each level is associated with a gameboard of multiple game elements rendered on the graphical user interface and having a game objective to be achieved in order to complete the level; and
an input component configured to receive player inputs from a first player engaging with each of the first set of levels of the first episode, the processor configured to detect player inputs to determine the selection of one or more game element by the player to create a match of at least three adjacent game elements of the same type, to remove the matching game elements from the game board and to repopulate the gameboard with replacement game elements,
the processor further configured to enable the game to determine when that level has been completed and to generate first player data indicating the level that the first player is engaged with, and to display on the graphical user interface a visual representation of relative positions of the first player and of a second player in the first set of levels based on completion time of one or more level in the first set of levels indicated by the first player data relative to a completion time of one or more of a second set of levels of the first episode indicated by second player data which determines the second player position.

26. The computer device according to claim 25 comprising a network interface configured to connect the computer device to a server for play in an online mode and to receive second player data when in the online mode.

27. The computer program comprising computer readable instructions stored on a non-transitory computer readable media, the computer readable instructions, when executed by a processor of a computer device, causing a method of controlling a graphical user interface of the computer device to be implemented, the method comprising:
displaying for an episode race on the graphical user interface a first set of levels of a plurality of levels of a game, the plurality of levels arranged in episodes, each episode comprising a set of levels, the levels of each episode playable in a predetermined sequence
wherein access to a next level is granted on completion of the preceding levels, wherein each level is associated with a gameboard of multiple game elements rendered on the graphical user interface and having a game objective to be achieved in order to complete the level;
at each of the levels in an episode, receiving player inputs from a first player engaging with that level, to enable the game to determine when that level has been completed and to generate first player data indicating the level that the first player is engaged with, wherein the player inputs are detected to determine the selection of one or more game element by the player to create a match of at least three adjacent game elements of the same type, to remove the matching game elements from the game board and to repopulate the gameboard with replacement game elements; and
displaying on the graphical user interface a visual representation of the relative positions of the first and second players, based on relative completion times of one or more level indicated respectively by the first player data and by second player data which determines the second player position.

* * * * *